United States Patent [19]

Ashford et al.

[11] Patent Number: 4,754,409

[45] Date of Patent: Jun. 28, 1988

[54] METHOD FOR DYNAMICALLY COLLECTING CURRENT DATA FROM SPECIFIED EXTERNAL PROCESSES AND PROCEDURES FOR USE IN AN EXPERT SYSTEM

[75] Inventors: Thomas J. Ashford; Nancy A. Burns, both of Austin; Richard L. Flagg, Round Rock; Christine T. Iwaskiw, Austin; Michael E. McBride, Austin; James T. Padden, Austin; Roberta P. Starbird, Austin, all of Tex.

[73] Assignee: International Business Machines Corporation, Armonk, N.Y.

[21] Appl. No.: 748,789

[22] Filed: Jun. 26, 1985

[51] Int. Cl.⁴ .............................................. G06F 15/18
[52] U.S. Cl. ...................................................... 364/513
[58] Field of Search ... 364/200 MS File, 900 MS File, 364/513

[56] References Cited

U.S. PATENT DOCUMENTS

| | | | |
|---|---|---|---|
| 4,644,479 | 2/1987 | Kemper et al. | 364/550 |
| 4,648,044 | 3/1987 | Joyce | 364/513 |
| 4,658,370 | 4/1987 | Clancey et al. | 364/300 |
| 4,670,848 | 6/1987 | Schramm | 364/900 |
| 4,713,775 | 12/1987 | Carlisle et al. | 364/513 |

*Primary Examiner*—Gareth D. Shaw
*Assistant Examiner*—John G. Mills
*Attorney, Agent, or Firm*—Richard E. Cummins; J. B. Kraft

[57] ABSTRACT

A method for solving problems using an expert system in which the Rulebase includes a section having specific definitions of processes or procedures which are available to the expert system as a data source. The method allows data to be collected dynamically in response to and in accordance with parameters supplied by the expert system and at a time determined by the expert system. The ability of the expert system to provide meaningful conclusions is considerably enhanced when such type of data is made available since any process or procedure that can be executed on the host for the expert system can become a source of current data for analysis by the expert system. Computer hardware diagnostic applications can include running self-diagnostic procedures even on the host system.

8 Claims, 12 Drawing Sheets

CLASSES

PRINTER
        TEXT = 'DOES YOUR PROBLEM SEEM TO INVOLVE YOUR PRINTER?'
        VALUES = 1 OF ('YES' 'NO')
        PREDEFINED WEIGHT = 1
    IBM 5215
        TEXT = 'ARE YOU USING AN IBM 5215 PRINTER?'
        VALUES = 1 OF ('YES' 'NO')
        PREDEFINED WEIGHT = 1
    SYMPTOM
        TEXT = 'DO YOU NOTICE ANY OF THE FOLLOWING SYMPTOMS:
                (1) CHARACTERS MISSING
                (2) CHARACTERS MISPRINTING
                (3) CHARACTER SMUDGED
                (4) PAPER FEEDS CROOKED
                (5) NONE OF THE ABOVE '
        VALUES = 1 OF 1:5
        PREDEFINED WEIGHT = 1
    PRINTERLITE
        TEXT = 'IS THE LIGHT BLINKING ON THE FRONT OF YOUR PRINTER?'
        VALUES = 1 OF ('YES' 'NO')
        PREDEFINED WEIGHT = 1

FIG. 3A

```
PROCEDURES

PRINTERTEST
        NAME = PRINTERTU
        PASS 32767        %SVC NUMBER %
        RETURN STATUSBIT HEX(1)
    END

PARAMETERS

PRINTERNUMBER
        TEXT = 'WHAT IS THE NUMBER OF YOUR PRINTER?'
        DEFAULT = 'IBM'

RULES

% RULE TREE 1 %
    1   GOAL
        TEXT = 'INSTALL A NEW ELEMENT OR RIBBON.'
        NAME = GOAL1
    2   OR
        NAME = LEVEL2OR
    3   AND
        NAME = RIBBON
    4   EVIDENCE
        NAME = PRINTER1
        CLASS = ('YES') OF PRINTER
    4   EVIDENCE
        NAME = YES5215
        CLASS = ('YES') OF IBM5215
    3   EVIDENCE
        NAME = SYMPTOM1
        CLASS = 1 OF SYMPTOM

% RULE TREE 2 %
    1   GOAL
        TEXT = 'REPORT SERVICE REQUEST NUMBER 151 048
                FOR THE   PRINTERNUMBER PRINTER.'
    2   AND
    3   NOT
    4   REFERENCE
        NAME = RIBBON
    3   OR
    4   EXTERNAL
        PROC = PRINTERTEST
        STATUSBIT NE '00' XB
    4   EVIDENCE
        CLASS = ('YES') OF PRINTERLITE
    3   EVIDENCE
        CLASS = 2 OF SYMPTOM
```

FIG. 3B

| SIZE | DATA TYPE | VARIANT INFORMATION |
|---|---|---|
| | IF REAL | REAL VALUE |
| | IF INTEGRAL | INTEGRAL VALUE |
| | IF BINARY | BOOLEAN ARRAY |
| | IF STRING | INDEX INTO MESSAGE FILE |
| | IF INDIRECT | POINTER TO RETURN VALUE |

METHOD FOR DYNAMICALLY COLLECTING CURRENT DATA FROM SPECIFIED EXTERNAL PROCESSES AND PROCEDURES FOR USE IN AN EXPERT SYSTEM

FIELD OF THE INVENTION

This invention relates in general to expert systems and in particular to an improved method for solving problems with an expert system in which the Rulebase has the capability of obtaining data dynamically by calling for a specific external process or procedure which is defined in the rule base so that external data can be collected from sources other than the operator.

RELATED APPLICATIONS

Ser. No. 749,076 entitled "Method for Processing an Expert System Rulebase on a System Having Limited Memory," filed concurrently herewith and assigned to the assignee of the present invention is directed to an expert system in which the rulebase is segmented into a plurality of contextual units, each of which requires less memory capacity than is available on the system, and each contextural segment has the capability of calling another segment and of being called by another segment.

BACKGROUND ART

Expert systems is a term applied to a special kind of problem solving computer program. The general function of expert systems is to solve (or assist in the solution of) problems normally addressed by highly trained and experienced human experts. This is not a new goal; in fact, many successful computer programs have achieved notable success in providing expert levels of performance in certain problem areas. What is different about expert system type programs is the approach taken, and the resulting form of the program itself.

EXPERT SYSTEMS VS. PROBLEM SOLVING SYSTEMS

The principal distinction between expert systems and traditional problem solving programs is the way in which the problem related expertise is coded. In traditional applications, problem expertise is encoded in both program and data structures. There are several unfortunate consequences of this organization.
1. The coded expertise is not clear to a problem expert who is not a programmer.
2. Programs are difficult to change.
3. Programs cannot be processed for other purposes.

In the expert system approach all of the problem related expertise is encoded in data structures only. None is in programs. Several benefits immediately follow from this organization.

An example may help contrast the traditional problem solving program with the expert system approach. The example is the problem of tax advise. In the traditional approach data structures describe the taxpayer and tax tables, and a program in which there are statements representing an expert tax consultant's knowledge, such as statements which relate information about the taxpayer to tax table choices. It is this representation of the tax expert's knowledge that is different for the tax expert to understand or modify.

In the expert system approach, the information about taxpayers and tax computations is again found in data structures, but now the knowledge describing the relationship between them is encoded in data structures as well. The programs of an expert system are independent of the problem domain (taxes) and serve to process the data structures without regard to the nature of the problem area they describe. For example, there are programs to acquire the described data values through user interaction, programs to represent and process special organizations of description, and programs to process the declarations that represent semantic relationships within the problem domain and an algorithm to control the processing sequence and focus.

Another benefit of the expert system approach can now be illustrated. Since the programs just described are independent of the problem domain, a new collection of knowledge declarations describing a new domain and using the old programs to process them can be defined. This will work if (and only if) the new problem area is describable in the data structures used for the initial domain. The time required to build the system if the programming base is already present is thus significantly reduced. The general architecture of an expert system involves two principal components: a problem dependent set of data declarations called the knowledge base or Rulebase, and a problem independent (although highly data structure dependent) program which is called the inference engine.

INDIVIDUAL INVOLVED WITH EXPERT SYSTEMS

There are generally three individuals having an interaction with expert systems. Primary among these is the end-user; the individual who uses the system for its problem solving assistance. In the building and maintenance of the system there are two other roles: the problem domain expert who builds the knowledge base, and a knowledge engineer who assists the experts in determining the representation of their knowledge and who defines the inference technique required to obtain useful problem solving activity.

THE END USER

The end-user usually sees an expert system through an interactive dialog, an example of which follows:

Q. Do you know to which restaurant you want to go?
A. No

Q. Is there any kind of food you would particularly like?
A. Unknown

Q. Do you like spicy food?
A. No

Q. Do you usually drink wine with meals?
A. Yes

Q. When you drink wine, it is French wine?
A. Why

As can be seen from this dialog, the system is leading the user through a set of questions, the purpose of which is to determine a suitable set of restaurants to recommend. This dialog begins with the system asking if the user already knows the restaurant choice (a common feature of expert systems) and immediately illustrates a characteristic of expert systems; users may choose not to respond to any question. In expert systems, dialogs are not pre-planned. There is no fixed control structure. Dialogs are synthesized from the current information and the contents of the knowledge base. Because of this, not being able to supply the answer to a particular questions does not stop the consultation.

Another major distinction between expert systems and traditional systems is illustrated by the following answer given by the system when the user answers a question with a question as occurred in the above example.

A. I am trying to determine the type of restaurant to suggest. So far Chinese is not a likely choice. It is possible that French is a likely choice. I know that if the diner is a wine drinker, and the preferred wine is French, then there is strong evidence that the restaurant choice should include French.

It is very diffucult to implement a general explanation system (answering questions like WHY and How) in traditional systems. The response of the expert system to the question WHY is an exposure of the underlying knowledge structure. It is a rule; a set of antecedent conditions which, if true, allow the assertion of a consequent. The rule references values, and tests them against various constraints or asserts constraints onto them. This, in fact, is a significant part of the knowledge structure. There are values, which may be associated with some organizing entity. For example, the diner is an entity with various attributes (values) including whether they drink wine and the kind of wine. There are also rules, which associate the currently known values of some attributes with assertions that can be made about other attributes. It is the orderly processing of these rules that dictates the dialog itself.

THE EXPERT

The domain expert's interaction with the hypothetical system can be illustrated if it is assumed that the preceding dialog ends with a set of restaurant choices that do not agree with the expert's recommendations. The expert would then use the explanation facilities to expose the reasoning performed by the system, and uncover the point of error. This process is made possible in part by the ability of the expert to understand the underlying knowledge declarations (rules and values). In the example it is assumed that the expert's choices differ from those of the system because the expert is aware that there are different occasions on which one dines, while the system is not. Specifically the expert considers three distinct occasions;
1. Business
2. Social
3. Romantic In addition, the expert makes use of this information to help refine the suggested restaurant choices. A particular rule might be;
If the restaurant choice includes French and the occasion is romantic then the restaurant choice is definitely "Jacques in le Box"

THE KNOWLEDGE ENGINEER

There are several observations that can be made about good knowledge representations.
1. A good knowledge representation must capture symbolic as well as numeric knowledge.
2. A good knowledge representation must be obvious (transparent) to a domain expert not trained in programming.
3. A good knowledge representation must permit the complete specification of a problem domain.

The knowledge engineer is concerned with the representation chosen for the expert's knowledge declarations and with the inference engine used to process that knowledge. There are several characteristics known to be appropriate to a good inference technique.
1. A good inference technique is independent of the problem domain. In order to realize the benefits of explanation, knowledge transparency, and reusability of the programs in a new problem domain, the inference engine must contain domain specific expertise.
2. Inference techniques may be specific to a particular task, such as diagnosis of hardware configuration. Other techniques may be committed only to a particular processing technique.
3. Inference techniques are always specific to the knowledge structures.
4. Successful examples of Rule processing techniques include:
   (a) Forward chaining
   (b) Backward chaining

THE INFERENCE RULE

An understanding of the "Inference Rule" concept is important to understand expert systems. An Inference Rule is a statement that has two parts, an if-clause and a then-clause. An example of an Inference Rule is:

If the restaurant choice includes French, and the occasion is romantic,
Then the restaurant choice is definitely Paul Bocuse.

An expert system's Rulebase is made up of many such inference Rules. They are entered as separate Rules and it is the inference engine that uses them together to draw conclusions. Because each Rule is a unit, Rules may be deleted or added without affecting other Rules (though is should affect which conclusions are reached). One advantage of inference Rules over traditional programming is that inference Rules use reasoning which more closely resemble human reasoning.

Thus, when a conclusion is drawn, it is possible to understand how this conclusion was reached. Furthermore, because the expert system uses knowledge in a form similar to the expert, it may be easier to retrieve this information from the expert.

CHAINING

There are two main methods of reasoning when using inference Rules: backward chaining and forward chaining.

Forward chaining starts with the data available and uses the inference Rules to conclude more data until a desired goal is reached. An inference engine using forward chaining searches the inference Rules until it finds one in which the if-clause is known to be true. It then concludes the then-clause and adds this information to its data. It would continue to do this until a goal is reached. Because the data available determines which inference Rules are use, this method is also called 'data driven.'

Backward chaining starts with a list of goals and works backwards to see if there is data which will allow it to conclude any of these goals. An inference engine using backward chaining would search the inference Rules until it finds one which has a then-clause that matches a desired goal. If the if-clause of that inference Rule is not known to be true, then it is added to the list of goals. For example, suppose a Rulebase contains two Rules:

(1) If Fritz is green then Fritz is a frog.
(2) If Fritz is a frog then Fritz hops.

Suppose a goal is to conclude that Fritz hops. The Rulebase would be searched and Rule (2) would be selected because its conclusion matches the goal. It is not known that Fritz is a frog, so this statement is added to the goal list. The Rulebase is again searched and this time Rule (1) is selected because its thenclause matches the new goal just added to the list. This time, the if-clause is known to be true and the goal that Fritz hops is concluded. Because the list of goals determines which Rules are selected and used, this method is called 'goal driven.'

CONFIDENCES

Another advantage of expert systems over traditional methods of programming is that they allow the use of Confidences. When a human reasons he does not always conclude things with 100% confidence. He might say, "If Fritz is green, then he is probably a frog" (after all, he might be a chameleon); or, that Fritz's leg is broken, but not much). This type of reasoning can be imitated by using numeric values called Confidences. For example, if it is known that Fritz is green, it might be concluded with 0.85 Confidence that he is a frog; or, if it is known that he is a frog, it might be concluded with 0.95 Confidence that he hops. These numbers are similar in nature to probabilities, but they are not the same. They are meant to imitate the Confidences humans use in reasoning rather than to follow the mathematical definitions used in calculating probabilities.

The following general points about expert systems and their architecture have been illustrated.

1. The sequence of steps taken to reach a conclusion is dynamically synthesized with each new case. It is not explicitly programmed when the system is built.
2. Expert systems can process multiple values for any problem parameter. This permits more than one line of reasoning to be pursued and the results of incomplete (not fully determined) reasoning to be presented.
3. Problem solving is accomplished by applying specific knowledge rather than specific technique. This is a key idea in expert systems technology. It reflects the belief that human experts do not process their knowledge differently from others, but they do possess different knowledge. With this philosophy, when one finds that their expert system does not produce the desired results, work begins to expand the knowledge base, not to re-program the procedures.

EXISTING EXPERT SYSTEMS

The prior art has disclosed various expert systems in which a "Rulebase" and an "inference engine" cooperate to simulate the reasoning process that a human expert pursues in analyzing a problem and arriving at a conclusion. In these prior art systems, in order to simulate the human reasoning process, a vast amount of knowledge needed to be stored in the knowledge base. Generally, the knowledge base of a prior art expert system consisted of a relatively large number of "if then" type of statements that were interrelated in a manner that, in theory at least, resembled the sequence of mental steps that were involved in the human reasoning process.

Because of the need for large storage capacities and related programs to store the Rulebase, most expert systems have, in the past, been run only on large information handling systems. Recently, the storage capacity of personal computers has increased to a point where it is becoming possible to consider running some types of simple expert systems on personal computers. A number of such programs and their applications are discussed in PC Magazine, dated Apr. 16, 1985 beginning on page 108. Another article entitled "Artificial Intelligence" appears on page 34 of PC World Magazine, Vol. 2 #1, dated January 1984.

Additional publications of interest that describe Expert Systems of the type represented by the present invention include;

1. "A User's Manual for Construct and Consult in the GPSI Environment" authored by Paul Nielsen, currently available from the University of Illinois KBPA Project.
2. Gordon, Robert K., A Rule Editor for an Expert System Environment: Towards Automating Knowledge Acquisition, M.S. Thesis, University of Illinois, Urbana, IL 1984.
3. Harandi, Mehdi T., A General Purpose System for Inferencing, Proceedings of the IBM University Study Conference, Raleigh, NC, October 1983.
4. Laursen, Andrew L., GPSI: An Expert System to Aid in Program Debugging, M.S. Thesis, University of Illinois, Urbana, IL, 1981.

In some applications of expert systems, the nature of the application and the amount of stored information necessary to simulate the human reasoning process for that application is just too vast to store in the active memory of a computer. In other applications of expert systems, the nature of the application is such that not all of the information is always needed in the reasoning process. An example of this latter type application would be the use of an expert system to diagnose a data processing system comprising many separate components, some of which are optional. When that type of expert system employs a single integrated Rulebase to diagnose the minimum system configuration of the data processing system, much of the Rulebase is not required since many of the components which are optional units of the system will not be present in the system. Nevertheless, prior art expert systems require the entire Rulebase to be stored since all the Rules were, in effect, chained or linked together by the structure of the Rulebase.

Cross referenced application Ser. No. 749,076 is directed to an expert system in which the Rulebase is segmented, preferably into contextual segments or units. When the Rulebase is segmented, it is then possible to eliminate portions of the Rulebase containing data or knowledge that is not needed in a particular application. The segmenting of the Rulebase also allows the expert system to be run with systems or on systems having much smaller memory capacities than was possible with prior art arrangements since each segment of the Rulebase can be paged into and out of the system as needed.

The segmenting of the Rulebase into contextual segments requires that the expert system manage various intersegment relationships as segments are paged into and out of memory during execution of the program.

Since the system permits a Rulebase segment to be called and executed at any time during the processing of the first Rulebase, provision must be made to store the data that has been accumulated up to that point so that at some time later in the process, when the system returns to the first segment, it can proceed from the last point or RULE node that was processed. Also, provisions must be made so that data that has been collected by the system up to that point can be passed to the second segment of the Rulebase after it has been paged into the system and data collected during the processing of the second segment can be passed to the first segment when the system returns to complete processing that segment.

In addition to permitting complex expert systems to run on systems with memories as small as 100,000 bytes of memory capacity, the segmenting of the Rulebase into contextual segments or units has the additional advantage that the writing and debugging of the Rulebase is easier and results in a more understandable Rulebase. Since a Rulebase may be "called" by the system, it is not necessary to duplicate the same Rulebase several times to conclude goals about similar but distinct items that are being analyzed.

Prior art expert systems do not provide a way for collecting data from external sources other than the operator. The applications of expert systems have therefore been somewhat limited and do not include, for example, on line hardware diagnostic of data processing system components or field replaceable units. The present invention provides an expert system arrangement in which the above limitations are eliminated.

SUMMARY OF THE INVENTION

The present invention is directed to an expert system in which the Rulebase includes a section for having specific definitions of processes or procedures which are available to the expert system as a data source from which data can be collected dynamically in response to and in accordance with parameters supplied by the expert system and at a time determined by the expert system. The ability of the expert system to provide meaningful conclusions is considerably enhanced when such type of data is made available It is therefore an object of the present invention to provide an improved problem solving method employing an expert system.

A further object of the present invention is to provide an improved method for collecting data in an expert system.

A further object of the present invention is to provide a method for the Rulebase of an expert system to specify that an external procedure be run and the results of running that procedure be collected and returned to the expert system A still further object of the present invention is to provide an improved method for collecting process type data for use by an expert system which permits the data being requested to include variable type parameters.

Objects and advantages other than those mentioned above will become apparent from the following description of the preferred embodiment of the present invention when read in connection with the drawing.

BRIEF DESCRIPTION OF THE DRAWING

FIGS. 3A and 3B illustrate the data for a sample Rulebase.

DESCRIPTION OF THE PREFERRED EMBODIMENT

The preferred embodiment of the present invention to be described employs a segmented Rulebase that has been established for the primary purpose of diagnosing the faulty hardware operation of a data processing system such as a personal computer. The overall objective of the embodiment is therefore to identify a Field Replaceable Unit (FRU) that is most probably the cause or source of the problem. The application of an expert system that employs a segmented Rulebase in accordance with the teachings of the cross referenced and in which procedures are run to collect data for use by the expert system is but one example of an application for this type of expert system. Other applications employing data collected by runnig external procedures and not using an segmented Rule base may readily be developed based on the following description of the preferred embodiment.

SYSTEM OVERVIEW

Figure 1:
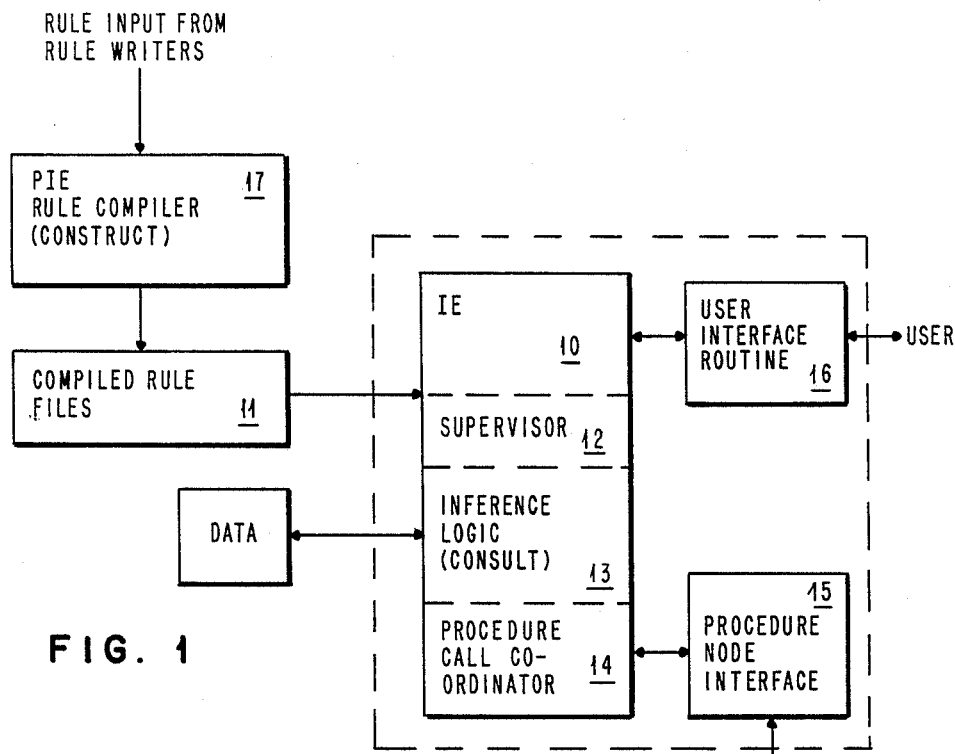
FIG. 1 illustrates the overall functional relationships of the components of an expert system in which the present invention is advantageously employed.

The main components of the expert system shown diagrammatically in FIG. 1 are an Inference Engine IE 10 and a Rulebase file 11. The Inference Engine 10 includes a supervisor program 12, inference logic 13, and a procedural call coordinator 14. Procedures A-N are interfaced to the coordinator 14 through the Procedure node interface 15. The operator interfaces with the supervisor through the operator or user interface block 16. The knowledge represented by the compiled Rulebase is generated by the file compiler 17, based on Rule inputs from Rule writers.

THE SUPERVISOR

The supervisor program 12 controls the flow of Rulebase calls. Its job includes storing the current Rulebase when suspension occurs, reading in the called Rulebase, knowing which Rulebase to load in next when a Rulebase is exhausted, and recognizing when all Rulebases are exhausted. When the appropriate Rulebase is read in, the supervisor 12 calls the Inferencing logic 13 to trace the Rulebase. When tracing is suspended, either because of a Rulebase call or because a Rulebase is exhausted, control is passed back to the supervisor 12, which determines the appropriate action to take. Reading in a Rulebase and deciding where to get the information is also handled by the supervisor.

THE USER INTERFACE

The function of the user interface 16 is to present questions and information to the operator and supply the operator's responses to the Inference Engine 10.

Expert systems generally require frequent interaction with a user through question and answering sessions, the presentation of conclusions, help-giving interchanges, and indications of errors. The method employed to provide this interaction can vary among the type of systems being employed. The user interface is generally dependent on the hardware and operating system being utilized in the host computer configuration.

In order to isolate all machine and application dependent code into separate modules which can be replaced for different hardware configurations or applications, all input and output routines formerly imbedded in the logic of the Inference Engine 10 in prior art expert systems have been extracted and combined into a general purpose user interface module 16 in the present arrangement. The user interface 16 has the capability of performing all the input and output functions previously processed inside the Inference Engine. The functions provided include the following:

1. Query the keyboard and return any keystrokes which the operator enters.
2. Display error messages.
3. Clear the display screen.
4. Present text and request keyboard input which must fall within a specified range and of a specified data type.
5. Present text and request keyboard input which must be of one or more of a set of specified character strings.
6. Present text and request input which may be any value of a specified data type.
7. Present text and return immediately to the inference engine (no response from the user required).
8. Present text and wait until the operator responds by hitting the "Enter" key on the keyboard.

Any values entered by the user must be received and interpreted by the user interface 16. Some responses are restricted to a set of possible legal answers, others are not. The user interface 16 checks all responses to insure that they are of the correct data type. Any reponses that are restricted to a legal set of answers are compared against these legal answers. Whenever the user enters an illegal answer, the user interface 16 informs the user that his answer was invalid and prompts him to correct it. In response to any question, the user may request help from the expert system in the form of explanation, review of consultation, or a trace of the Rule tree being processed. In addition, the user may request to discontinue the process entirely. In this case, the user interface 16 must recognize this and communicate this fact to the Inference Engine. Communication between the user interface 16 and the Inference Engine 10 is perfomed through the use of a User Interface Control Block (UICB) which is passed between the two.

The UICB in the preferred embodiment contains the following fields:

A. Action Flags: This field is employed to indicate the action to be taken by the user interface.
B. Status Flags: This field indicates the action to be taken by the system.
C. Response Number: This is a value indicating the number of responses required.
D. Response Pointer: This is a pointer to a length list of possible legal answers.
E. High Field: Contains the high range for range responses, the data value depends on the response value action flags.
F. Low Field: Contains the low range for range responses. The data value depends on the response value action flags.
G. Answer Pointer: This field contains a pointer to a length list of answers given by the user.
H. File Name: This field contains the name of the file containing text and character string values.
I. File Index: Contains the logical record number in the text file of records to be displayed.

Enumerating the actions to be taken by the user interface 16 and the Inference Engine 10 makes it possible to replace the entire user interface module 16 without impacting the code of the inference engine 10 in any way. As a result, any changes in the user interface method, operating system display routines, or display hardware are transparent to the inference engine.

PROCEDURE NODE INTERFACE

The function of the Procedure node interface 15 is to receive information from the coordinator and create the appropriate Procedure Call. The ability to call a Procedure and receive information from that Procedure can be viewed as simply a generalization of input from the external world. While in some prior art expert systems, information from a procedure has been obtained, that information was obtained only in a predetermined manner so only certain information could actually be acquired. This expert system, through the knowledge base, is permitted to invoke any Procedure allowed on its host system. This might seem somewhat straightforward, but the nature of Rulebase programming is such that this is both somewhat foreign and difficult. Creating a linkage mechanism for the running of arbitrary Procedures allows the expert system to be truly independent of the knowledge base that is used. This, in turn, makes the expert system useful in a much wider class of knowledge domains than if it had no external access or only limited external access.

An example of the usefulness of such a function follows. Assume a consultant operator is to determine the optimal itinerary for air travelers. Substantial information will be required concerning the airline schedules between the points of departure and arrival so that an optimal choice may be made. While it would be possible for an operator to enter the information, it is not at all reasonable. It would be easier for the operator to make the decision himself. Alternatively, the information could be coded into the knowledge base of the expert system. Unfortunately, the flight information changes so rapidly that this also would not be practical. The required information concerning flights should be resolved instead by reference to a data base by the calling of the Procedure in accordance with the present invention. While this is not a reasoning step, the reasoning process could not continue without this information.

Similarly, in the area of machine diagnostics using expert systems, it is not possible to conclude the current state of "health" of a machine without some information. The best source of information is the machine itself, for it contains much detailed information that could not reasonably be provided by the operator.

The ability to call external Procedures is useful also to send messages or post specific information on highly formatted displays under control of the knowledge base and without custom tailoring of the basic expert system. Also, any action permissible on the host can be caused to occur. Specifically, the system permits the loading of other Procedures and their dynamic binding to existing routines, the exercising of hardware, and the display of messages. The details of the implementation of how Procedures are called are set forth later on in the specification.

THE RULEBASE

The knowledge that is represented in the system appears in the Rulebase 11. There are basically four different types of objects, with associated information present in this expert system's Rulebase 11:

1. Classes—these are questions asked to the user. The information associated with a Class is its name, the answer or answers which the user gives to the question, and the Confidence associated with that answer. The Confidence is a number between 0 and 1 that indicates how likely it is that the answer is correct.
2. Parameters—a Parameter is a place holder for a character string which may be a variable that can be inserted into a Class question at the point in the question where the Parameter is positioned. The data that is variable may be obtained by also asking the user a question. For example, a Parameter, "User_Name" may represent the name of the user and be obtained by asking the user, "What is your name?" The information used by the system is the Parameter name and the associated character string. The response provided by the user is inserted as the variable in the Class when it is displayed.
3. Procedures—these are definitions of calls to external Procedures. The information associated with the Procedure is the name of the Procedure definition, the values passed, and the values returned. This area of the Rulebase provides the basis for the improved method of collecting data from external sources other that the operator.
4. Rule Nodes—The inferencing in the system is done by a tree structure which indicates the Rules or logic which mimics human reasoning. The nodes of these trees are called RULE nodes. There are several different types of RULE nodes, the details of which are described later in the specification. The node designated External is employed to specify the procedure call.

Figure 2:
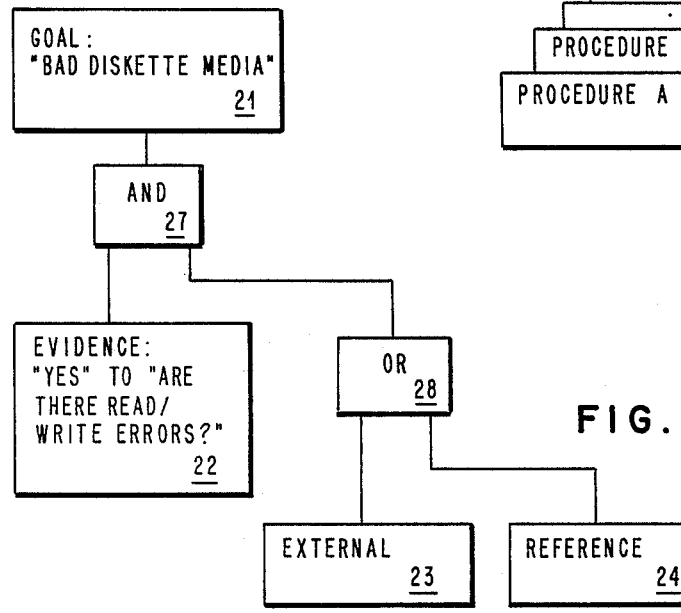
FIG. 2 illustrates schematically, a sample Rule tree.

FIG. 2 shows a sample Rule tree greatly simplified. The Rulebase comprises a forest of many such n-ary trees. The top node 21 of the tree is called the Goal node, in that it contains the conclusion. Each tree in the forest has a different root node. The leaves of the tree are also referred to as RULE nodes, or one of the types of RULE nodes. A leaf may be an EVIDENCE node, an EXTERNAL node, or a REFERENCE node.

An EVIDENCE node functions to obtain information from the operator by asking a specific question such as EVIDENCE node 22. In responding to a question presented by an EVIDENCE node, the operator is generally instructed to answer "yes" or "no" represented by numeric values 1 and 0 or provide a value of between 0 and 1, represented by a "maybe."

Questions which require a response from the operator other than yes or no or a value between 0 and 1 are handled in a different manner which is described later in the specification.

A leaf that is an EXTERNAL node such as 23 indicates that data will be used which was obtained from a Procedure Call. In the preferred embodiment of a diagnostic application, a Procedure Call could, for example, cause a specific data pattern to be written on a diskette and read to provide an indication if an error was detected.

A REFERENCE node such as 24 functions to refer to another tree or subtree.

A tree may also contain intermediate or minor nodes between the Goal node and the Leaf node. An intermediate node can represent logical operations like nodes 27 and 28 in FIG. 2.

If a node B is immediately below node A, then node B is called A's child and A is the parent of B. In this case, the tree of which B is the top node is called a subtree of A. Since a subtree may be just a single node, saying A has two children is equivalent to saying A has two subtrees.

The Rule compiler 17, shown in FIG. 1, takes the Rule input that the Rule writer provides and compiles it into the Rulebase file 11 which serves as input that the Inference Engine 10 uses. This input includes the Rule logic as well as the definition for Procedure Calls.

THE INFERENCE LOGIC

The inference logic 13 in FIG. 1, referred to as CONSULT has two functions. It selects a tree to trace and then it traces that tree. How CONSULT selects a tree is described later. Once a tree has been selected, CONSULT traces that tree depth-first, left to right.

The word "tracing" refers to the action the system takes as it traverses the tree, asking Classes (questions), calling Procedures, and calculating Confidences as it proceeds. Thus, in order to obtain a Confidence for node B, the system traces the subtree of which B is the top.

Each of the various types of nodes has a Confidence value associated with it. The manner in which the Confidence value is obtained depends on the type of node involved. The Confidence value for an external node depends on the values returned by the Procedure that was called. The Confidence value for an EVIDENCE node is based on the answer provided to the question that was posed to the operator. A REFERENCE node has a Confidence value based on the Confidence value of the tree to which it refers.

As the Confidence of a node is updated, CONSULT goes through all the trees and changes the Confidence of any node that refers to the updated node or depends on the evidence obtained by that node. CONSULT also immediately propagates those new Confidences up the trees as far as it can before it finds a node that it has not evaluated. Once it has completed this, it continues to trace the selected tree. CONSULT will continue to trace a selected tree until a Confidence has been calculated for its GOAL node. It then selects the next tree to be traced.

The selection of a tree depends on the ordering of the trees. The original ordering of the trees is the order in which they appear in the Rulebase. This order can be changed, however, by assigning an EVIDENCE node an attribute "initial" which is described in detail later. The first action taken by CONSULT is to obtain values for all EVIDENCE nodes which have been assigned an "initial" attribute. Using only the answers to these initial Evidences, CONSULT orders the Rules so that the most likely to succeed is evaluated first. It does this by propagating up the tree Confidences that are calculated based only on these initial Evidences. It then uses the Confidence calculated for a GOAL node as an indication that that tree will succeed. The trees can be further re-ordered since they are constantly being updated as a selected tree is being traced.

A SAMPLE RULEBASE STRUCTURE

Figure 4:
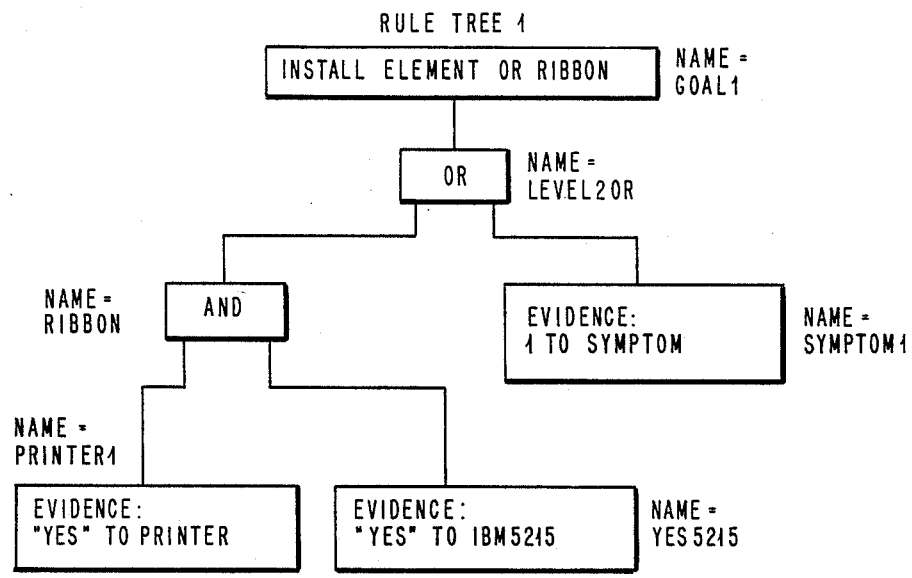
FIG. 4 is a Rule tree constructed from the input data shown in FIG. 3.
Figure 5:
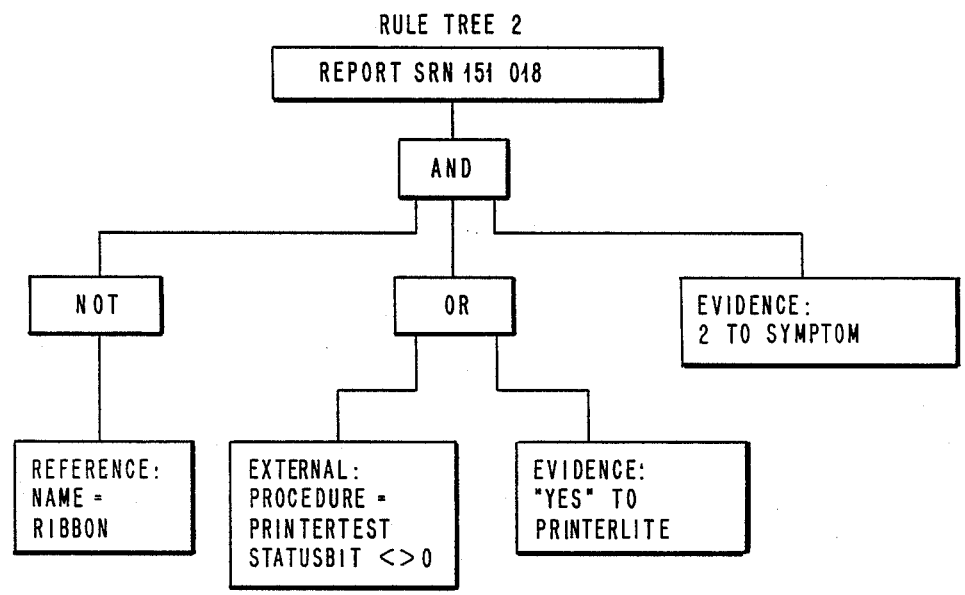
FIG. 5 is another tree constructed for the input data shown in in FIG. 3.

The Rule compiler 17 in FIG. 1, also called CONSTRUCT, takes as input a file provided by the Rule writers. From this input file, it constructs the trees that are used as Rules. CONSULT traverses these Rule trees to make deductions about the problem being investigated. It is helpful to an understanding of the invention to first have a brief overview of the Rulebase and to follow an example. A sample input for a Rulebase is, therefore, described and shown in FIG. 3, and a drawing of the Rule trees generated by this input is shown in FIGS. 4 and 5. Also provided is an introductory explanation of the input syntax.

Look first in FIG. 3 at the section of the Rulebase that starts with the word "Rules." The text "% Rule 1%" is a comment. The input for Rule 1 follows this comment. The tree that corresponds to Rule 1 is shown in FIG. 4.

The structure shown in FIG. 4 is indicated in FIG. 3 in the input by the order of the input and by the numbers appearing to the left. These numbers indicate the level of the node being described. For example, A GOAL node is the top node of this tree and this is indicated by the text "1 GOAL." The word following the number specifies the type of node, e.g., GOAL, AND, OR, EVIDENCE, etc. The nodes appear in the order defined by a depth-first, left to right traversal of the tree. In this example, each node has been given a name (indicated by "name=") so that the relation is clear between the structure of the tree and the ordering of the nodes in the input file.

Immediately following the GOAL node is the text to be presented to the user if this goal is concluded. This is indicated by "text=." The text itself is enclosed in single quotes.

There are three EVIDENCE nodes in the tree shown in FIG. 4. An EVIDENCE node must have two things defined for it: the question to be asked to the user, and the answer(s) that will cause this evidence to be true. This information is contained in the line:

```
class=('yes') of printer
```

'yes' is the one answer that will make this evidence true. The question is specified by referring to one of the items in the Class section of the Rulebase.

In this case, the Class is named printer.

In this example, Class definitions are located in the very first section of the Rulebase input file as shown in FIG. 3. This section starts with the word "Classes."

The first Class defined is the Class named "printer." Following the name of the Class is the text for the question associated with this Class. This is indicated by "TEXT=." The string enclosed in single quotes is presented to the user so he can respond with an answer. The line:

```
values=1 of ('yes' 'no')
``` gives two pieces of information. It indicates by the phrase "1 of" that exactly one answer will be accepted from the user. It also lists in parenthesis all possible answers with which the user may respond. In this case, yes and no are the only two allowable answers.

Since it is more than likely that the Rulebase will have many EVIDENCE nodes that ask the same question, the function of a Class item becomes obvious. The question merely has to be included once in the Class section, with an appropriate name that can be referred to by an EVIDENCE node that needs to ask that question.

The section headed Procedures in FIG. 3 defines Procedure Calls. In this example, there is one Procedure Call definition with an ID of "printertest." This definition specifies that the Procedure to be called is "printertu," that one value is passed (32767), and that there is one variable returned called "statusbit." An EXTERNAL node uses information obtained from a Procedure Call. In the second Rule tree, shown in FIG. 5, under the OR node is an EXTERNAL node. It refers to the Procedure Call definition by its ID, "printertest." This node is evaluated true if the comparison it specifies is true; namely, if the return variable "statusbit" is not equal to zero.

One other section is present in this sample Rulebase shown in FIG. 3: the section named Parameters. In this example, there is one Parameter, "printernumber." This Parameter shows up as "$printernumber" in the text for the Goal of Rule Tree 2 shown in FIG. 5. When the Goal text is presented to the user, the Parameter name will be substituted by a string that the user provides. The string will be obtained by asking the user, "What is the number of your printer?," which is the question given in the Parameter definition. If no answer is provided by the user, the default answer, 'IBM,' will be substituted.

Briefly, the Rules section describes the Rule trees. EVIDENCE nodes refer to Classes specify questions along with possible answers to those questions. Parameters allow a string to be substituted in text before that text is presented to the user. Many of the details of the Rulebase are described later in the specification.

CALCULATING CONFIDENCES

As discussed above, the system supports a number of different node types. These nodes vary in purpose and evaluation. All nodes, except those found at the leaves of the trees, have Confidence values passed to them by their children. A node uses the children's Confidences to compute its own Confidence. Further adjustments may be made to the computed Confidence before passing this Confidence up to the parent node. The general features of Confidences and threshold values and how they work will first be described. The attributes or properties which can be specified for a node that affect the Confidence the node passes up will then be described. The different node types and how they compute their Confidences is also described.

As a Rule tree is traced, a Confidence value is associated with each node. This value is a number between −1 and 1, inclusive, and is an indication of how likely it is that a node is true. These Confidence values are meant to help mimic the kind of heuristic reasoning a human does. For example, a statement beginning, "It is very likely that . . . " would have a higher Confidence associated with it than a statement which begins, "There is some chance that . . . " By associating different Confidences with different Evidences and inferences, different goals will be concluded with different weights. This means that when a Rulebase is traced, there will not be just one Goal concluded as true; instead, several Rules may be concluded with varying Confidences. The added power and flexibility of Confidences is one advantage to expert systems over traditional programming approaches.

CONFIDENCES FOR EVIDENCES

Confidences can be associated with EVIDENCE nodes in two ways: either the user provides a Confidence or the Rulebase provides it. If the user is providing the Confidence, then after answering a question, he is prompted to also provide a Confidence to associate with that answer. When the Rulebase provides the Confidence, the default value is provided in the Rulebase. The user answers the question and the Confidence stated in the Rulebase is associated with that answer.

CONFIDENCES FOR EXTERNAL NODES

The Confidence to be given to an EXTERNAL node is provided by the Rulebase. This is done using a WEIGHT attribute which is discussed later in the specification.

While there are four major sections to the Rule file, Classes, Procedures, Parameters, and Rules, the only required section is Rules.

THRESHOLDS

Each node has a property list which contains data about the node including a number of attributes. Each node has associated with it two threshold attributes: a high threshold and a low threshold. If the high and low thresholds are not specified in the Rulebase, then they default to 1 to 0, respectively. If a Confidence computed for a node falls above the high threshold, the node is considered to be true or concluded. If the Confidence computed for a node falls below the lower threshold, the node is considered to be false or rejected. These thresholds are useful for several purposes. If a GOAL node is concluded, that goal is presented to the user. It is the high threshold that determines if it will be concluded true. Thresholds are used to perform the Normalize function for a node. This function is described next.

NORMALIZATION FUNCTION

Any node can be given the attribute "normal." If a node has this attribute, then its Confidence is normalized before it is passed up the tree. If LOW=the low threshold defined for the node, HIGH=the high threshold defined for the node, and C=the Confidence computed for the node, then the Normalize function is defined as:

```
if C > = HIGH
    then NORMALIZE(C) = 1
else if C < = LOW
    then NORMALIZE(C) = 0
else
    NORMALIZE(C) = (C − LOW)/(HIGH − LOW)
```

ASSOCIATIVE FACTOR

A node has assigned to it an Associative factor which defaults to 1 if it is not explicitly set in the Rulebase. The Associative factor indicates how strong the association is between a node and its parent. After the Confidence for a node has been computed, this Confidence is multiplied by the Associative factor, and the product is passed up to the parent node. As an example, if a node has a Confidence of 0.9 and an Associative factor of 0.8, 0.72 is passed to the parent node.

ATTRIBUTES OR PROPERTIES

In general, the ordering of attributes within a Class or node definition does not matter. There can be as many as described for each type of node and they may occur in any order. The use and function of the attributes are as described below.

ASSOCIATION

USE: The ASSOCIATION attribute may be used with any RULE node.

FUNCTION: The ASSOCIATION attribute is used to specify the value for the Associative factor discussed above. Once a Confidence for a node is obtained, the Confidence is multiplied by the Associative factor before it is passed up to the parent node as explained in detail earlier. If no Associative attribute is specified, then the ASSOCIATION attribute defaults to 1; that is, it does not affect the Confidence for that node. The Association factor is multiplied after the node has received its final weight. It affects the weight the parent node received, but not the weight of the given node. If a REFERENCE node references a node with the ASSOCIATION attribute, the value given the REFERENCE node is the weight before multiplication by the Association factor.

CALL

USE: The CALL attribute is used with any RULE node. It is not required.

FUNCTION: The CALL attribute is an 'action' attribute. It causes another Rulebase to be called. This action occurs only if the weight of the node is evaluated to be greater than or equal to the high threshold for that node. If another Rulebase is called, the Rulebase presently being traced is stored, and execution of the new Rulebase is begun. It is assumed that the called Rulebase has already been compiled (constructed). When the called Rulebase completes, control returns to the original Rulebase and the system continues processing this Rulebase from where it left off.

CLASS

USE: The CLASS attribute is only used with an EVIDENCE node. It is not required.

FUNCTION: The CLASS attribute specifies the Class referred to by an EVIDENCE node. It tells the name of the Class and also tells which answers to that Class will cause the EVIDENCE node to be evaluated TRUE. The EVIDENCE node was described earlier.

DEFAULT

USE: The DEFAULT attribute is used only with a Parameter.

FUNCTION: The DEFAULT attribute specifies a text string for a Parameter. If no other string is provided by the user, then this default string will be used as the Parameter's value.

DELETE

USE: The DELETE attribute is used only with a Procedure Call definition. It is not required. If no function (EXECUTE, LOAD, or DELETE) is specified, the default is EXECUTE.

FUNCTION: The DELETE attribute is specified for a Procedure node definition to delete that Procedure from memory. If the DELETE attribute is specified, the PASS and RETURN attributes are not required.

EXECUTE

USE: The EXECUTE attribute is used only with a Procedure Call definition. It is not required. If no function (EXECUTE, LOAD, or DELETE) is specified, the default is EXECUTE. See also the DELETE and LOAD attribute.

FUNCTION: The EXECUTE attribute is specified for a Procedure node definition when that Procedure is to be executed (rather than loaded or deleted).

EXPLANATION

USE: The EXPLANATION attribute can be used with a Class, a Parameter, or an EVIDENCE node. It is not required.

FUNCTION: The EXPLANATION attribute specifies a text string. Its purpose is to supply explanatory text to help the user. If the user does not understand a question presented to him, he may ask for further explanation by entering ?e. This causes the text provided by the EXPLANATION attribute to be presented to him. If a Class question is being asked when ?e is entered, the user is presented the EXPLANATION text provided by that Class. If a Parameter question is being asked, ?e will cause that Parameter's explanatory text to be presented. If an EVIDENCE node has a question in the node (rather than referring to a Class), then ?e will present explanatory text provided in that node. In any case, if ?e is entered by the user when there is no EXPLANATION attribute present, the system responds with "There is no explanation provided" and re-asks the questions.

GLOBAL

One of the main vehicles employed by this system for passing collected data between different segmented Rulebases during one session or the same Rulebase if the session was interrupted, involves the assignment of a GLOBAL or LOCAL attribute to each node. A GLOBAL attribute may be assigned to any node in a Rule tree. As an example, suppose the first Rulebase executed by the system determines the hardware configuration by running some test units. If the operator wanted to diagnose several components of the system, i.e., the printer, the disk drive, and the keyboard, a new session could be started for every component. It is, of course, more efficient to run the configuration test just once for all the sessions and then pass the information on to the various segmented Rulebases. Similarly, if each component to be tested required a separate Rulebase, the configuration information must be passed to all the Rulebases. As mentioned previously, any node may be given a GLOBAL attribute. If an EVIDENCE node is GLOBAL, the question is asked only once during multiple sessions. The answer the operator gives is retained as the value throughout all sessions. Similarly, a Procedure or test unit is executed only once during multiple sessions. Parameters are evaluated the same as GLOBAL EVIDENCE nodes. A node assigned a GLOBAL attribute retains its weight or value between sessions. If an EVIDENCE node or EXTERNAL node is GLOBAL, the question or Procedure it references may be asked or executed, but the node will not be updated or re-evaluated. If an intermediate node (such as an "and/or" or "not") is assigned the GLOBAL attribute, then the underlying tree is not re-evaluated between sessions.

The GLOBAL attribute is also used to pass values between Rulebases when multiple Rulebases are executed in the same session. A session is defined as the execution of the Rulebase to determine the solution to a unique problem.

The GLOBAL attribute is also used to pass values between Rulebases when multiple Rulebases are executed. If a value either for an EVIDENCE node, Parameter, or test unit result is needed between Rulebases then that answer, test unit, Procedure, or Parameter is assigned the GLOBAL attribute in both Rulebases. When a node having a GLOBAL attribute is given a value in one Rulebase, that value will be retained in both Rulebases. The nodes assigned a GLOBAL attribute will not be re-asked or re-executed, but will be given the same value.

A node in a Rule tree can reference another tree with the use of a REFERENCE node. The node to be referenced is given a unique name attribute. The referencing node refers to the named node and is given the value of the referenced node. It is possible to reference a node in another Rulebase by giving both the REFERENCE node and the referencing node the GLOBAL attribute.

In summary, the GLOBAL attribute enables the system to retain the value of a question, Procedure, Parameter, or RULE node between sessions and to pass the value assigned to the RULE node between Rulebases. Both of these capabilities are necessary for an expert system with Rulebases that have been segmented into contextual units.

LOCAL

The LOCAL attribute enables the system to continually update data and EVIDENCE nodes as data changes during a consultation session. The system has the ability to collect static or dynamic data and to distinguish between the two types of information.

If the question at the EVIDENCE node is to be asked every time, the question must be assigned the LOCAL attribute. Similarly, if a test unit is executed every time, it is referenced in an EXTERNAL node and must be assigned the LOCAL attribute. The LOCAL attribute is different from the RE-ASK attribute to be described later on. The RE-ASK attribute specifies that a Class be re-asked only when the node with the RE-ASK attribute is evaluated. The LOCAL attribute, on the other hand, indicates that the question be re-asked every time it is referenced in an EVIDENCE node. The same difference holds between the assignment of the LOCAL attribute to a Procedure node and the RE-EXECUTE attribute, which is described later on.

If an EVIDENCE or EXTERNAL node is assigned the LOCAL attribute, that node is not updated when the question or test unit it references is asked or executed from another node. Instead, the node is updated only when selected by the system.

The LOCAL attribute is used, for example, to ask a question to the operator many times during the diagnosis of a printer. If the system continually directs the user to adjust the hardware, it then becomes necessary to ask the user the same question, "Does the test line print out on the printer?" every time the user has completed an adjustment of the hardware as the answer may change with any steps that the user takes. That EVIDENCE node or question would be assigned the LOCAL attribute.

HIGH/LOW

USE: The HIGH and LOW attributes are used for RULE nodes. They are not required. If not specified, default values are assumed of 1 and 0, respectively.

FUNCTION: High and low thresholds for a node are specified using the HIGH and LOW attributes, respectively. If a Confidence computed for a node is greater than or equal to the HIGH threshold, then that node is considered TRUE. If the Confidence is less than or equal to the LOW threshold, then the node is considered FALSE. Thresholds are also important when applying the NORMAL attribute. These thresholds and how they work were described in detail earlier.

INITIAL

USE: The INITIAL attribute can be specified for a Class, a Parameter, a Procedure Call, or a RULE node. It is not required.

FUNCTION: Before ordinary Rule processing is started, objects given the INITIAL attribute are evaluated. Procedures designated as INITIAL are executed first; next, RULE nodes which are INITIAL are evaluated; thirdly, Classes assigned an INITIAL attribute evaluated; lastly, Parameters with INITIAL attributes are evaluated. After all initial objects with INITIAL attributes have been evaluated, the rest of the Rulebase is then processed.

LOAD

USE: The LOAD attribute is used only with a Procedure Call definition. It is not required. If no function (EXECUTE, LOAD, or DELETE) is specified, the default is EXECUTE.

FUNCTION: The LOAD attribute is specified for a Procedure Call definition when that Procedure is to be loaded (rather than executed or deleted).

NAME-IN RULE NODE

USE: The NAME attribute can be given to either a RULE node or a Procedure Call definition. It serves a distinctly different function in the two cases. This discusses the NAME attribute applied to the RULE node. This is not a required attribute for a RULE node.

FUNCTION: The NAME attribute allows a node to be given a name. This name allows the subtree headed by the named node to be referenced by a REFERENCE node. The NAME attribute in the REFERENCE node specifies which node is being referenced. Having nodes with names is also useful when debugging a Rule file.

NAME-IN PROCEDURES SECTION

USE: This discusses the NAME attribute applied to the Procedure Call definition. This attribute is a required attribute for a Procedure Call definition.

FUNCTION: The NAME attribute in a Procedure Call definition specifies the name of the Procedure to be called.

NORMAL

USE: The NORMAL attribute is used only with RULE nodes. It is not required.

FUNCTION: If the NORMAL attribute is specified for a node, then the node's Confidence is normalized before it is passed up to its parent node. The normalize function was discussed earlier. Though the normalize function does not require a high or low threshold, it has no effect on the node if the default values for the thresholds are assumed. The normalize function is the last step when computing a node's value. If another node references a node with a NORMAL attribute, it receives the normalized value.

PASS

USE: The PASS attribute is used only with a Procedure Call definition. It is not required.

FUNCTION: The PASS attribute specifies what is to be passed to the Procedure when it is called. The PASS attribute may specify the actual value to pass, a Class name, a return value from another Procedure, or the type of the value to be passed. If the type only, is specified, then the value must be set in the EXTERNAL node. Parameters passed can be: fullword integer, hexadecimal, real, binary, or character string.

POWER OFF

USE: The POWER_OFF attribute is used only with a Class. A Class having the POWER_OFF attribute should not have a VALUES attribute.

FUNCTION: The POWER_OFF attribute indicates that the text of this Class will request the user to power off the machine. This attribute must be included to let the expert system know that it must save the state of the Rulebase before the text is displayed. A Class with a POWER_OFF attribute should not have a VALUES attribute. Since the machine will be powered off, any answer that the user gives to this Class would not be saved by the expert system.

PROC

USE: The PROC attribute is used in an External node only.

FUNCTION: An EXTERNAL node must specify a Procedure Call definition. This is done using the PROC attribute. The ID specified is the name of the Procedure Call definition as opposed to the name of the Procedure itself.

RETURN

USE: The RETURN attribute is used with a Procedure Call definition. It is not required.

FUNCTION: The RETURN attribute is used to specify the variables that will be returned when a Procedure is called. For each variable, a name is specified. This allows an EXTERNAL node to refer to this returned variable. Also specified for each variable is the type of that variable such as fullword integer, real number, binary, hexadecimal, or string.

SETC/SETP

USE: The SETC or SETP attribute can be used with any RULE node. They are not required. There may be multiple SETC and SETP attributes in a RULE node. However, in a single node, there may be only one SETC attribute for a given Class, and only one SETP attribute for a given Parameter.

FUNCTION: The SETC and SETP attributes are 'action' attributes. The SETC attribute causes a Class to be set to a specified value and the SETP attribute causes a Parameter to be set to a specified value. This action occurs only if the node is evaluated to have a weight greater than or equal to the HIGH threshold for that node. A Class can be set to a constant value. Also, if the SETC attribute is in an EXTERNAL node, a Class may be set to a value returned from the Procedure invoked by this EXTERNAL node.

A Parameter can be set to a character string. Also, if the SETP attribute is in an EXTERNAL node, a Parameter may be set to a character string returned from the Procedure invoked by this EXTERNAL node.

TEXT

USE: The TEXT attribute can be used with a Class, a Parameter, a Procedure Call definition, or with the following RULE nodes: GOAL, HYPOTHESIS, or EVIDENCE. If a Class or Parameter may be evaluated by asking the user a question, then the TEXT attribute is required for that Class or Parameter. It is not required if the Class or Parameter will always be set internally.

FUNCTION FOR A Class, Parameter, OR EVIDENCE Node: In this case, the TEXT attribute supplies a question to be presented to the user. Text for a Class is presented to obtain value(s) for that Class. Text for a Parameter is used to obtain a texting string value to be given the Parameter. In the case of an EVIDENCE node, if the node does not refer to a Class, then it must provide a question using the TEXT attribute.

FUNCTION FOR A GOAL NODE, HYPOTHESIS NODE, OR Procedure Call definition: In this case, the TEXT attribute provides information for the user, but no response is expected. Text for a GOAL or HYPOTHESIS node is a statement of the conclusion associated with that tree. This text is presented if the GOAL or HYPOTHESIS is evaluated TRUE; that is, if the Confidence computed for that node falls above the HIGH threshold. The text given for a Procedure Call definition is presented when the Procedure is called. This is to inform the user about what is happening. For example, 'Diskette test is being run' or 'Be patient—this will take about 5 minutes.'

VALUES

USE: The VALUES attribute is used only with a Class. For most purposes, it is a required attribute; however, if no response is expected from the user, it may be omitted.

FUNCTION: The VALUES attribute provides two types of information for a Class. It indicates the allowable answers for that Class and it specifies how many answers will be expected.

The VALUES specified can take one of three forms:
1. A list of discrete string values.
   ('yes' 'no' 'maybe')
2. A range of numbers. The number can be integer, real, or binary.
   (1:15)
   (2.2:4.3)
   ('00'xb:'FF'xb)
   When specifying a range, open ended intervals can be indicated using an *.
   (1:*)
   (*:10.0)
   The first example allows any positive integer (that is, any integer greater than or equal to 1). The second example allows any real number less than or equal to 10.0.
3. A type, This form is used when the Class will always be set internally by using the SETC attribute in a RULE node. Since it is being set internally, the user will not be asked for an answer. All that needs to be specified is the type of the answer. Valid types are: integer, real, binary, hexadecimal, or string.

The other information provided by the VALUES attribute is the number of answers allowed for a Class question. This number is indicated by a positive integer or ANY.' This tells the system the number of times to prompt the user for an answer. If ANY' is specified, The system continues to prompt the user for an answer until the user enters a null line. If the number of allowed answers is not specified, it defaults to 1.

Classes may eliminate the VALUES attribute entirely. This indicates that no particular value will be entered by the user. Instead, he should simply press the ENTER key. This option is used when text needs to be presented but no answer is expected. For example, the user may be informed: 'Please check to be sure your printer is plugged in. Press enter when you have done this.' In this case, no answer is required from the user. When a Class has no VALUES attribute, EVIDENCE nodes using that Class will get a Confidence equal to the weight of that Class (i.e., they will never get one minus the weight).

WEIGHT/PREDEFINED WEIGHT

USE: The WEIGHT or the PREDEFINED WEIGHT attribute may be used with a Class, a Procedure Call definition, or an EVIDENCE node. It is not required. If not specified, it defaults to 1.

FUNCTION FOR A CLASS: Every Class has a weight associated with it. This weight is a number between $-1$ and 1, inclusive, and indicates how much 'Confidence' should be associated with the answers given for the Class. The WEIGHT or PREDEFINED WEIGHT attributes are used to set this weight. If neither attribute is used, the weight defaults to 1. If the WEIGHT attribute is given to a node without the word PREDEFINED preceding it, then the user is first asked to supply a weight. Only if he declines to do so is the value specified by the WEIGHT attribute used. If the attribute PREDEFINED WEIGHT is given for a node, then the user is never asked for a weight. The value defaults to the value defined by PREDEFINED WEIGHT.

WEIGHT

FUNCTION FOR A PROCEDURE: Every Procedure Call definition has a weight associated with it. This weight is a number between $-1$ and 1, inclusive, and indicates how much 'confidence' should be associated with the return values. The WEIGHT or PREDEFINED WEIGHT attributes are used to set this weight. If neither attribute is used, the weight defaults to 1. If either WEIGHT or PREDEFINED WEIGHT is given for a node, then the value defined by this attribute is given to the Procedure Call definition. The user is never asked to supply a weight for a Procedure Call definition.

FUNCTION FOR EVIDENCE NODE: If an EVIDENCE node does not refer to a Class but provides its own question, it may have either the WEIGHT or the PREDEFINED WEIGHT attribute. If neither attribute is specified, then the user is prompted to supply a number between 0.0 and 1.0 inclusive. If PREDEFINED WEIGHT is used, the user is prompted to answer 'yes' or 'no.' If he answers 'yes,' then the predefined weight is given to the node; if he answers 'no,' then one minus the predefined weight is given to he node. If WEIGHT is specified (without PREDEFINED), then the user is prompted to enter 'yes,' 'no,' or a weight between 0.0 and 1.0, inclusive. If he enters 'yes,' the node is given the weight; if he enters 'no,' the node is given one minus the weight; if he enters a number, then the node is given that weight.

RE-ASK/RE-EXECUTE

The RE-ASK and RE-EXECUTE attributes provide the system the ability to continually update data and evidence as it is gathered from the operator or from the hardware. As conditions change, for example during diagnosis of the hardware, the evidence may change. Goals are then reached based on the most recent evidence available.

It may also be necessary to selectively RE-ASK a question to the operator or to selectively RE-EXECUTE a test unit on the hardware. For example, a test unit which tests the cable connection may be executed. If the test fails the first time, the operator may be requested to install a new cable. The test unit may then be executed a second time to verify the connection. Similarly, the system may ask the user "Is the printer turned on?" If not, the user may be requested to turn it on and the question will be reiterated. If a question is to be re-asked, the attribute RE-ASK is assigned to the EVIDENCE node containing a reference to the question. Similarly, if a test unit is to be re-executed, then the attribute RE-EXECUTE is assigned to the EXTERNAL node containing a reference to the test unit. The first time that the question is asked, only those EVIDENCE nodes that reference the same question and do not have the RE-ASK attribute will be evaluated or updated "true" or "false," depending on the answer. When the system chooses the EVIDENCE node marked RE-ASK, the question is asked again, even though it was previously asked. An EXTERNAL node with the RE-EXECUTE attribute is evaluated similarly to an EVIDENCE node with the RE-ASK attribute.

PASSING INFORMATION BETWEEN RULEBASES

The need to pass information between Rulebases is obvious where the Rulebases are segmented. For example, a calling Rulebase may need to pass some initial information to the called Rulebase, such as a value to a Class or an answer to a Parameter. Also, the same Rulebase might be called multiple times to test multiple instances of the same item. This would be done, for example, to test several disk drives present on the same system. When this is done, certain Classes must be set first, such as the drive speed so that the called Rulebase will test the correct device in the appropriate manner. Conclusions from one Rulebase may influence conclusions in another Rulebase. Thus, it is necessary for a node in one Rulebase to reference a node in another Rulebase. Some Procedures should only be run once, but values returned by these Procedures might be used by several Rulebases so there must be a way also of passing procedural information between Rulebases. In the case of the diagnostic application of the preferred embodiment, some information is gathered from the user before the expert system is called. An example of this type of information is the type of testing to be done. There needs to be a way to pass this information to the system so that it will not have to re-ask this question.

Where information associated with any object needs to be passed between Rulebases, that object is given the attribute, "GLOBAL." This alerts the system that this is information that may be used in more than one Rulebase. The GLOGAL attribute has been discussed earlier.

THE GLOBAL LIST

The supervisor program 12 in FIG. 1 functions to keep a list of Global objects, to maintain this list with the latest values, and to update Rulebases with values from this list. A single linked list is kept which stores information for any type of object defined to be Global. The list is referred to as global list. Each record of the length list holds the following information:

1. The name of the object.
2. The object type, e.g., Class, Procedure, Parameter, or RULE node. This is used to double check that the correct object has been located and also allows objects of different types to be given the same name.
3. A Boolean variable IN_CURRENT RULE BASE which is true if the Global object is in the current Rulebase.
4. A Boolean variable used to indicate if a Class or Parameter has been asked or if a Procedure has been executed.
5. The Confidence associated with a Class, a RULE node, or a Procedure.
6. A pointer to a Response list which holds the answer for a Class or a Parameter or the return values for a Procedure.
7. A pointer to the next Global record which makes the list a linked list.

The supervisor program 12 maintains the Global list in the following manner: As a Rulebase is being read in, when an object marked as Global is encountered, the Global list is searched to see if that object is on the list. If it is on the list, the information present on the Global list is obtained from the supervisor and the rest of the information is read in from diskette. If the object is not on the Global list, it is added to the list from the diskette. All information for that object is read in from the diskette. In either case the Boolean variable IN_CURRENT_RULEBASE is set to be true.

After a Rulebase is read in, the inferencing logic 13 is invoked. When another Rulebase is called or when the current Rulebase is exhausted, control is returned to the supervisor 12. Before storing the current Rulebase out to the diskette file, the Global list must be updated with the information just obtained. The Global list is searched for any object which has the Boolean variable IN_CURRENT_RULE BASE set to be TRUE. Any such object is updated with current information and the Boolean variable is reset to be FALSE.

Thus, at this point, the Global list is current and the next Rulebase read in will get the latest information. One of the most complicated cases of passing information to the system is when a node in one Rulebase references a node in another Rulebase. The list of Global objects is used also for this function. In the ordinary case, when a node references another node in the same Rulebase, the referencing node has a pointer to he referenced node so that it can be located and its Confidence obtained. In the case when a node in the current Rulebase references a node in another Rulebase, the referenced node is not even present in the current Rulebase and is not in memory so it cannot have pointers to it. This obstacle is overcome using the Global list. The referencing node is given the GLOBAL attribute so that its Confidence is stored on the Global list. The supervisor 12 recognizes when a Rulebase is read in which references a node that is not in memory. The supervisor then creates a dummy node for the current Rulebase and gives that dummy node the Confidence and name of the referencing node stored on the Global list. In the current Rulebase, references to the out-of-memory node are pointed to this dummy node in the same manner as if it were actually the node in the current Rulebase. The inferencing logic 13 can then treat these Global references just like ordinary references and perceives no differences.

The Global list is also used to pass values into the system. One of the Parameters passed to the system when it is called is a pointer to the Global list. If no information is passed then this pointer is null. If information needs to be passed in, the calling program puts the information on the Global list before the expert system is called.

The use of Global objects, i.e., objects assigned a GLOBAL attribute, increases flexibility of the system. Information can be passed into the system when it is invoked. Classes and Parameters can be evaluated in one Rulebase and used in another. A Procedure need only be executed once, even if it is used in two different Rulebases, because the values can be stored and passed using the Global list. It is even possible, to reference a node that occurs in a different Rulebase. Global objects provide many advantages to a segmented Rulebase without losing the advantages of a single Rulebase structure.

As discussed earlier, the Rulebase 11 has four major sections; Classes, Procedures, Parameters, and Rules which are also referred to collectively as objects. A summary description of each of these sections was presented earlier. A more detailed description, together with a sample and example of how each section is arranged follows.

CLASSES SECTION

A sample Classes Section follows:

```
CLASSES
    printer
        text = 'Does your problem seem to involve
        your printer?'
        values = 1 of ('yes' 'no')
        predefined weight = 0.8
    ibm5215
        text = 'Are you using an IBM 5215 printer?'
        explanation =
            'On the front of the machine in the
            top right hand corner there should be
            a silver metal square with IBM logo
            on it. In the bottom left corner of
            this square there is a four digit
            number which is the number of the IBM
            printer you are using. If this
```

-continued
```
            number is 5215, then you are using an
            IBM 5215 printer.'
        values = ('yes' 'no')
        initial
        weight = 1
        global
    symptom
        text = 'Do you notice any of the following
        symptoms:
            (1) characters missing
            (2) characters misprinting
            (3) character smudged
            (4) paper feed crooked
            (5) none of the above'
        values = any of (1:5)
    printerlite
        text = 'Is the light blinking on the front of
        your printer?'
        values = 1 of ('yes' 'no')
        predefined weight = 1
        local
```

The above example illustrates how the Classes section is organized. The first word is CLASSES. Following this the Classes are defined. The general form of a Class is: an identifier (which is the Class name) followed by the attributes for that Class (e.g., TEXT, INITIAL, etc.). In this example, the Classes are: printer, ibm5215, symptom, printerlite. The attributes for a Class may appear in any order. The definition of a Class is terminated by the next Class name. The beginning of another section terminates the Classes section.

PARAMETERS SECTION

Parameters, as discussed earlier, are used as a place holder for a text string value. This value is provided by the user or from a Procedure Call. When Parameters are used within text, the Parameter name must have the character '$' affixed to the beginning of the name. This allows it to be recognized as a Parameter name. A Parameter will be replaced by the character string it represents before the text is displayed to the user. Parameters can be used within any text string.

A sample Parameters Section follows:

Note that the Parameter PRINTERNUMBER is referenced using $PRINTERNUMBER in both the Class "printer" and in the goal TEXT of Rule tree 1.

```
CLASSES
    printer
        text = 'Does your problem seem to involve
        your $PRINTERNUMBER printer?'
        values = 1 of ('yes' 'no')
        predefined weight = 1
PARAMETERS
    printernumber
        text = 'What is the number of your
        printer?'
        explanation = 'The number of your printer
                        is a four digit number.
                        This can be found in the
                        upper right corner of the
                        front of your machine.'
RULES
    % Rule Tree 1%
    1   GOAL
        text = 'Report service rlquest number 151 018
        for the $PRINTERNUMBER printer.'
    2   AND
    3   EVIDENCE
        class = ('yes') of printerlite
    3   evidence
```

-continued

```
class = 2 of symptom
```

The above example illustrates the organization of the Parameters section. The first word in the section is the key word PARAMETERS. Following this are the names of the Parameters. Under each Parameter name are the key words for the attributes given to that Parameter.

When appropriate, the attribute is followed by the value for that attribute. The ordering of the attributes within a Parameter definition does not matter. A Parameter definition is terminated by the next Parameter name. The Parameters section is terminated by the beginning of another section.

PROCEDURES SECTION

The Procedures section of the Rulebase provides the Procedure Call definitions. These provide information such as the Procedure to call, variables to pass, and name and type of variables returned. Procedures Calls are invoked by EXTERNAL nodes and the values returned from the Procedures are used in these nodes. When a Procedure is called, EXTERNAL nodes referring to that Procedure Call definition are evaluated to TRUE or FALSE. This evaluation depends on the values returned from the Procedure and the comparisons given in the EXTERNAL node.

A sample Procedures Section follows. The following shows a Rulebase file with a Procedure Call definition. It also includes a Rule node which refers to this Procedure Call with an EXTERNAL node.

```
CLASSES
PROCEDURES
    printertest1
        name = printertu
        pass 32767 % SVC number %
        return statusbit hex(1)
    end
    printertest1
        name = printertu
        pass 99999 % SVC number %
        return status hex(1)
        error_number integer
    end
    diskettetest
        name = diskettetu
        pass 666890
        return address integer
        status hex(1)
    end
RULES
    1  GOAL
        text = 'Report Service Request Number 151 018 for
            your printer.'
    2  OR
    3  EXTERNAL
        proc = printertest reexecute
        status NE '00'XB
        error_num LE 5
    3  evidence
        class = 'yes' of printerlite
```

The first word in the Procedures section is PROCEDURES. Following that are the IDs of the Procedure Calls defined (in the example, printertest 1 diskettetest). Following each Procedure Call ID, are the attributes for the Procedure Call being defined. Ordering of attributes within a Procedure Call definition does not matter. A Procedure Call definition is terminated by the word 'end.' The beginning of another section terminates the Procedures section.

RULES SECTION

Rules is the section of the Rulebase file which defines the Rule trees. For each tree, each node of the tree is defined and the attributes for it are specified.

A definition for a Rule tree is ended by the beginning of the next Rule tree.

A sample Rules section follows.

```
% rule Tree 1%
1  GOAL
    text = 'Report service request number 151
        017.'
    high = .7
    name = goal1
2  AND
    asso = 0.8
3  AND
    normalize
4  EVIDENCE
    name = printerl
    asso = 0.9
    class = ('yes') of printer
4  EVIDENCE
    name = ribbons
    class = ('no') of ribbon
3  EVIDENCE
    name = symptom1
    class = 1 of symptom
% Rule Tree 2%
1  GOAL
    text = 'Report service request number 151 018
        for the $printernumber printer.'
2  AND
3  NOT
4  REFERENCE
    name = ribbon
3  EVIDENCE
    class - ('yes') of printerlite
3  EVIDENCE
    class - 2 of symptom
```

The above examples illustrates how the Rule section is organized. The level of a node is indicated by an integer number at the beginning of the node definition. The ordering of the nodes is defined by a depth-first, left to right search. The order in which the trees appear is important because this influences the order in which they are traced.

SYMBOLS SECTION

The Symbols section is the section of the Rulebase which defines the Symbols used in the text of Classes, Parameters, Procedures, and Rules. A symbol represents a text string. Symbols are assigned a text string value in the Symbols section. Elsewhere in text, the Symbol name is used rather than having to key in the whole text string. Symbols are useful when text strings may frequently change or when the same text string appears in many different texts. Symbols also make it easier to guarantee that text is consistent between Rulebases. The Rule writers can include a Symbols section in their Rulebase and then use these Symbols in their text. One person can be responsible for writing the text strings for the Symbols, making the text consistent and easy to modify.

When Symbols are used within text, the Symbol name must have the character '&' affixed to the beginning of the name. This allows the system to recognize it as a Symbol name. A Symbol will be replaced by the character string it represents before the text is displayed to the user.

A sample Symbols section follows:

```
SYMBOLS
    printer =     'IBM5215 printer'
    part2 =       'the back of the electronics board'
    FRU13 =       'the &printer ribbon'
    SRN =         '/'010 234''
    tools =       '(1) voltmeter
                  (2) screwdriver
                  (3) solder
                  (4) soldering iron'
RULES
    1 GOAL
        text =    'The &printer is defective. Call your
                  customer service representative and
                  report number &SRN.. The &part that
                  needs to be replaced is &fru13..'
    2 OR
    3 EVIDENCE
        class = ('yes') of buzzing
    3 EXTERNAL
        proc = printertest
        return_code <> '00'xb
```

The above example illustrates how the Symbols section is organized. The first word is SYMBOLS. Following this are the names of the Symbols defined: printer, part2, FRU13, SRN, and tools. Each Symbol name is assigned a string in single quotes. Everything that is contained within the quotes is substituted for the Symbol name in the text. If a single quote is used within the text it must be preceded by a backslash or another single quote. The beginning of another section terminates the Symbols section. There can be more than one Symbol section and they can be interspersed among all the other Rulebase sections in any order. If some of the Symbols to be used by the Rule writers are common then a common "symbol include" file may be used. This file would contain a Symbol section like the one described above. The file would be "included" in the beginning of the Rule file.

To use a Symbol within a text the symbol name is preceded by an "&" (ampersand) and inserted in the text wherever the substitution should be made. Note that the "&" is not used in the Symbol definition, but is present when the Symbol is used. The Symbol name can be terminated with a blank or a period. If the Symbol is terminated with a blank, the blank is treated as a normal input character and is left in the input line. If a Symbol is terminated with a period, the Symbol name is concatentated with the next input character and the period is removed. In the example, the GOAL text would be displayed as:

The IBM5215 printer is defective. Call your customer service representative and report number '010 234.' The &part that needs to be replaced is the IBM5215 printer ribbon.

Note that the Symbol SRN is concatenated with a period and the Symbol printer is not concatenated with anything but is followed by a blank. If a Symbol is undefined or misspelled when used in text, there will be no substitution performed and the Symbol name preceded by an "&" will be displayed instead. For example, there is no symbol definition for "part" so instead of substituting a string "&part" is displayed.

THE CONCLUDED GOALS LIST

The subdivision of the knowledge into several contextual units requires that several Rulebases, rather than just one, be traced. The same Rulebase might be traced several times in order to draw conclusions about multiple devices of the same type. Therefore, names of the Rulebases had to be tracked, not only for final reporting purposes, but also for stack maintenance in order to page Rulebases in and out.

Another requirement is that all Rulebases called be completely traced and all possible goals concluded.

Also, all concluded Goals have to be remembered and presented to the user in an organized fashion after completion. This means storing goals internally in a list. This concluded Goals list is passed back to the calling program so it can sort and organize the conclusions before presenting them. The Rulebases are tracked using a linked list of control blocks. This linked list is called the RBCB List. Each control block is a record with the five fields as indicated below.

Field A is the Rulebase name;

Field B has a return code which is zero if the Rulebase is executed successfully;

Field C has a Boolean variable which is set to true when this Rulebase is completely traced;

Field D is a pointer to the list of goals concluded for this Rulebase which is passed back to the supervisor;

Field E is a pointer to the next control block on the list;

When the supervisor 12 is called, it is passed a pointer to the RBCB list. At this point, the list has only one control block on it and this control block contains the name of the initial Rulebase to be processed. The supervisor maintains this list and returns it to the calling program at completion. By that time, the list should have several control blocks on it, one for each Rulebase which was called. The list may even have several control blocks for the same Rulebase if this Rulebase was called more than once.

Each control block on the list has a pointer in Field D to a Goals List concluded for that Rulebase. Each Goal List record in the individual Goals List has the following fields.

1. The text for the goal concluded;
2. The Confidence with which that goal was concluded;
3. A pointer to the next goal.

Due to memory constraints, most text to be used by the system is stored on diskette. The concluded Goal List, however, must hold the goal text internally. The same Rulebase may be run for two different devices and character strings will be substituted into the goal text Field A to show for which devices the goal was concluded. There is only one text file on diskette for this Rulebase even though it is called multiple times. If the goal text with the substitution is written back to that file, then only the last device tested would have the correct goal information. Also, the particular application may be large enough that two diskettes will be required. If the goal text fields was written back to the currently loaded diskette, then part of the text would be written on one diskette and part on the other. The fact that the system remembers the Rulebases it calls, along with all the concluded Goals, increases its usefulness. This makes the system useful for applications which need to call an expert system and then return to continue processing. Because the system stores its acquired knowledge and makes it accessible to a calling program, it can become a subset of a bigger, problem solving system, unlike other expert systems.

DATA STRUCTURES OVERVIEW

The storing in memory of Rules, Classes, Procedures, and Parameters is done through the use of major linked lists of records. The detailed organization of major linked lists will be described in connection with FIGS. 9, 10, 11 and 12 which illustrate the various relationships of the linked lists for the objects.

Figures 7, 8:
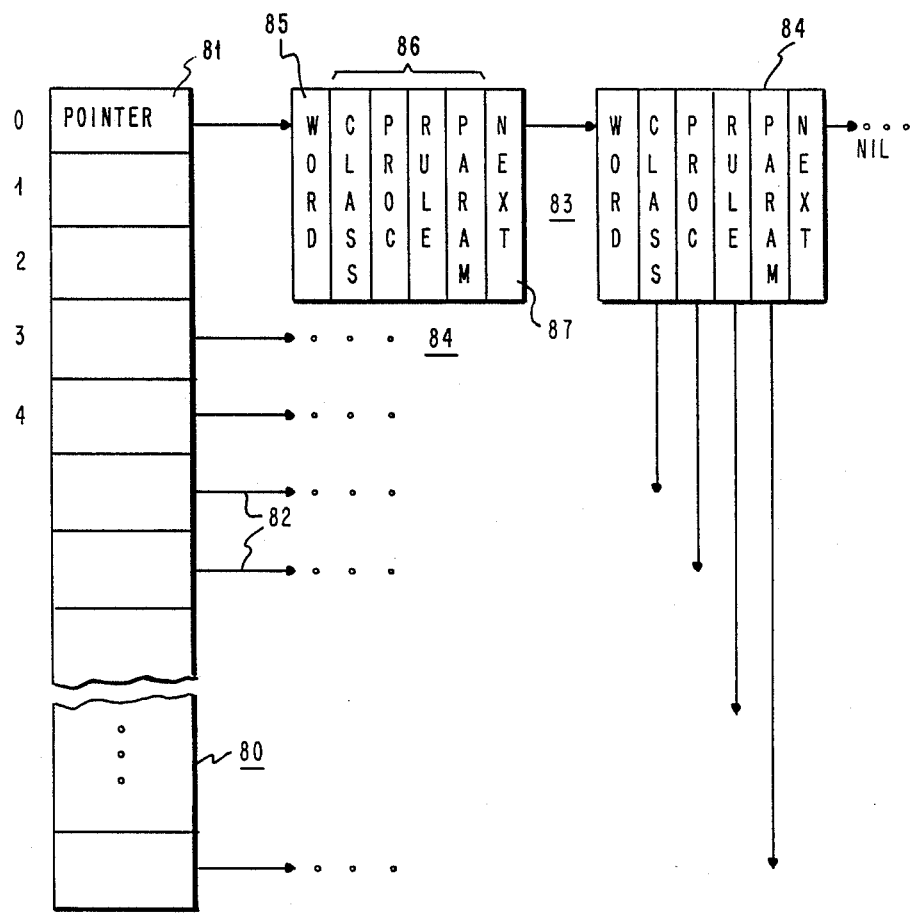
FIG. 7 illustrates the general format of the variable field of the records shown in FIG. 6.
FIG. 8 illustrates the relationship of the link lists to the Hashtable structure.

First, however, a general overview is provided of the data structures. A conventional hashtable as shown in FIG. 8 is used in which the index into the hashtable is computed from the object's name. Each entry in the hashtable is a pointer to a linked list of records, called hashbuckets, each of which contains a name of the object that hashed to that location in the hashtable.

Each hashbucket has a pointer to the corresponding object, whether it be a RULE node, a Parameter, a Procedure, or a Class. Each object has associated with it a linked list of property records which hold property names and values for the associated object. The term "property" is used interchangeably with the term "attribute." Examples of data stored in property nodes are: high and low thresholds for RULE nodes, indices into the text file for Class questions or Goal text, or a property indicating the name of the Rulebase to call if the RULE node having this property evaluates to true.

Each EVIDENCE node is a member of some Class. A pointer is stored on the RULE node's property list under the property name 'Evidsource.' Evidsource points to the hashbucket which contains the name of the source Class. This hashbucket also has a Classref pointer to the corresponding Class node.

When the Class is evaluated, all members of this Class are updated. These members (all of which are EVIDENCE nodes) are located in the data structures as follows. The Class node has a rulelink pointer to the first RULE node which is a member. On this RULE node's property list is a property named 'member.' The member property points to the next RULE node which is a member of the Class being considered. On this new RULE node's property list is a property member pointing to the next member of the Class, and so on. When the last member is found, its property member will have a null pointer. Thus any member of a Class has a pointer to the Class (through the Evidsource property). All members of the Class are linked together by a membership linked list (through the "member" property).

EXTERNAL nodes, their relationship to their source Procedure, and the membership list for that Procedure are handled in the same way as Evidences and Classes.

When a REFERENCE node is encountered, the node it references must be located so its Confidence can be obtained. The referencing node and the referenced node must have the same name; therefore, they hashed to the same place in the hashtable. The REFERENCE node has a pointer called 'name' which points to a hashbucket containing the node's name. This hashbucket has a Rulelink pointer, pointing to the RULE node being referenced. Once a node is evaluated, all nodes referencing it are updated. These are linked together by use of the 'Cousin' pointer in the RULE node. Cousin points to the next node which references the RULE node at the head of the list. Thus every REFERENCE node points to the node it references (using the pointer 'name'). All nodes referencing a given node are linked together by the Cousin pointer declared in the RULE node. When the system locates a REFERENCE node, it follows the name pointer to the original node. It then evaluates this node and updates all references to this node by following the Cousin linked list.

THE LINKED LISTS

The Rulebase comprises four major linked lists and a plurality of minor associated linked lists. Each major linked list corresponds to one of the four objects types of the Rulebase.

The first major link list is for Class objects and includes a separate record for each Class contained in the Rulebase. The Class records have the format of fields shown in FIG. 6.

Figure 6A:
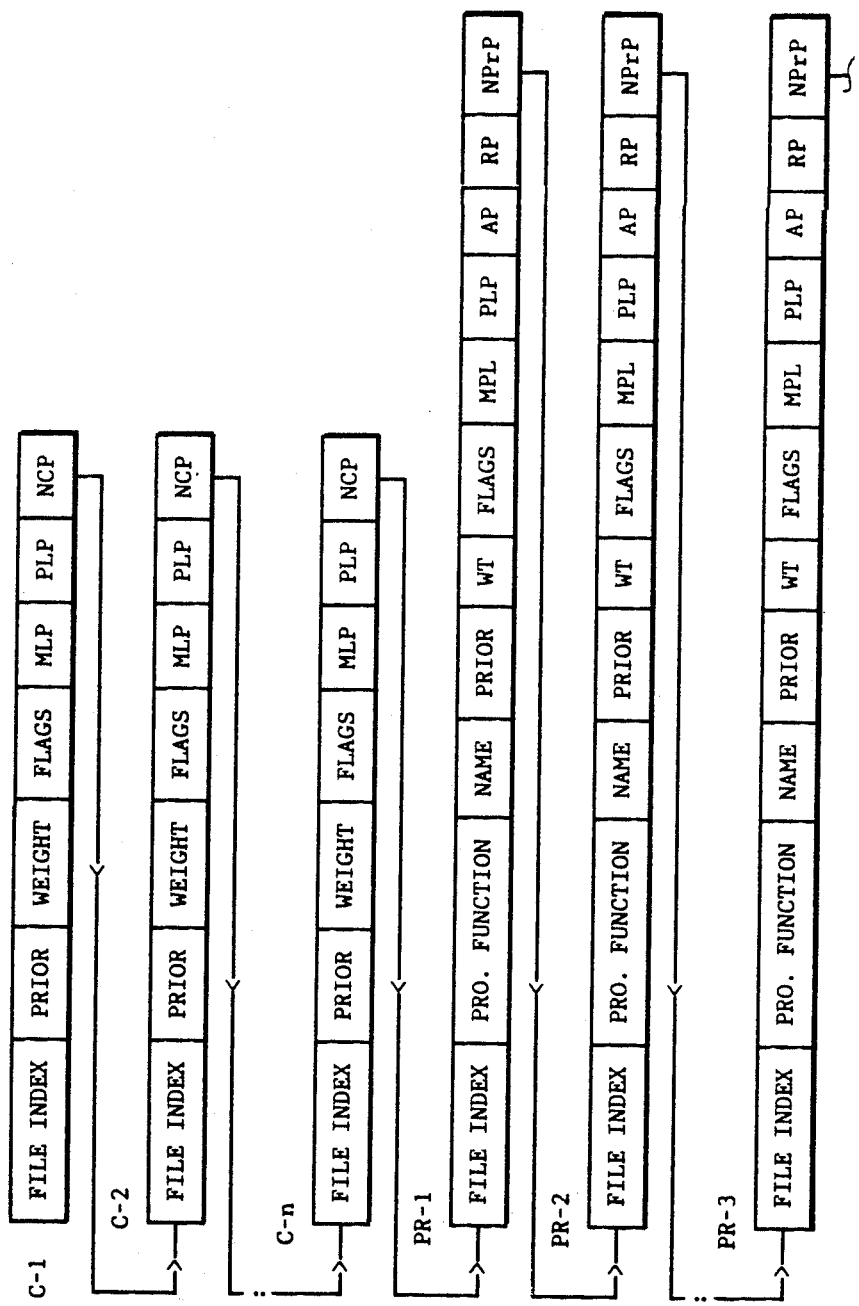
FIGS. 6A and 6B illustrates the records of the major linked lists.
Figure 6B:
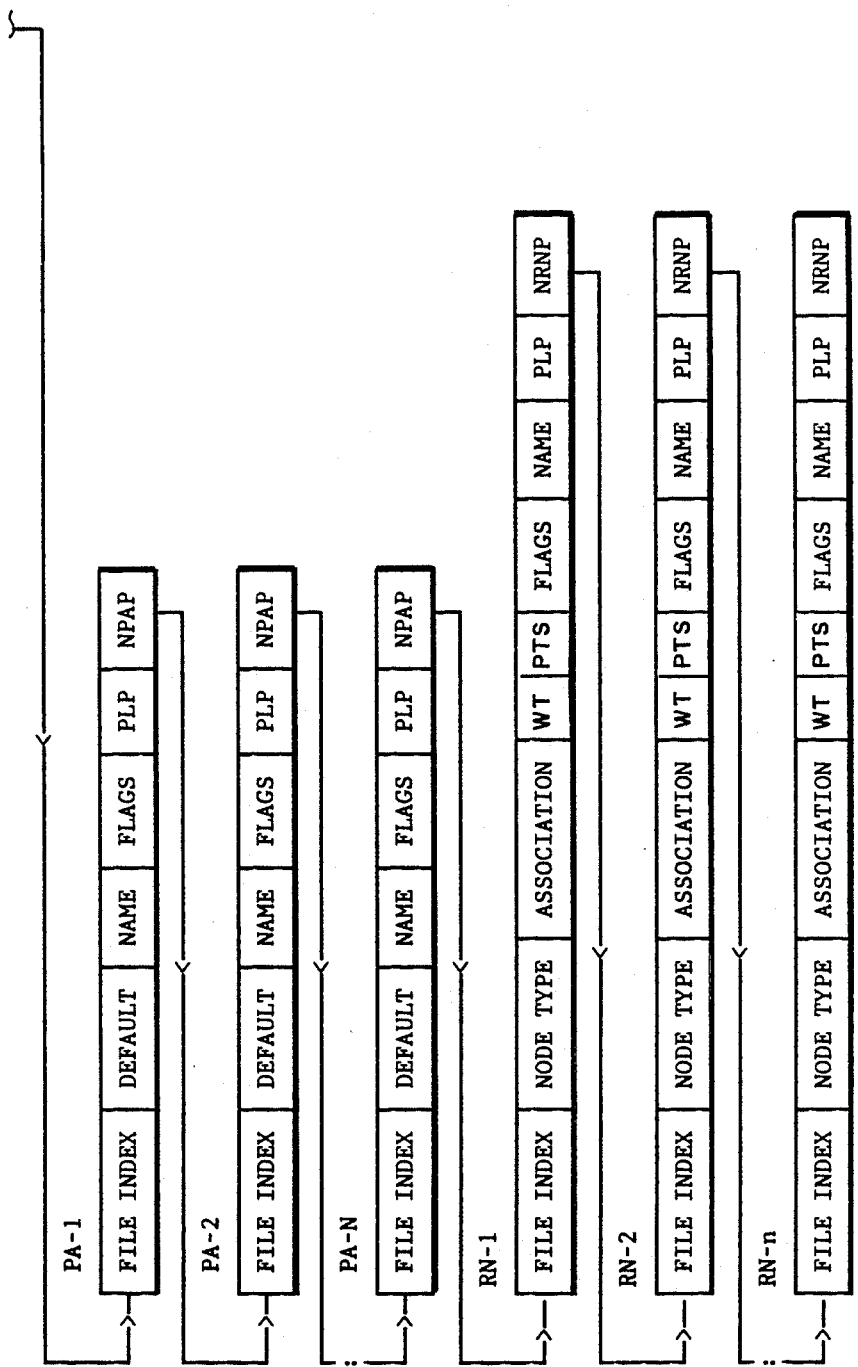

The general format of the records shown in FIG. 6 depends, to some extent, on the programming language employed to code the Rulebase. As shown each record in the Class section is a fixed length record and each has the same number of fields. The records in the other sections are also fixed length records but the length is not necessarily the same for all sections. It may be assumed that the general format of the records in the other minor linked lists associated with the major linked lists, e.g. the Property linked lists, permit a variable number of fields in each record with each field having a variable number of characters. The Pascal programming language has a variant record structure, an example of which is shown in FIG. 7 which is employed in the preferred embodiment of the present invention for these other associated linked lists. It should be assumed that in the following discussion, all records for the minor linked lists use the variant record structure unless stated otherwise.

THE CLASS RECORD

Referring again to FIG. 6, the format of the Class records includes a file index field which functions to identify the sequential position of the record in the Rulebase relative to the other records. The next field is the initial weight assigned to the Class, while the third field is the current weight assigned to that Class. As discussed earlier, WEIGHT is an attribute or property assigned to an object that reflects on how the Confidence is calculated for that node. The flag field for a Class consists of a number of attributes or properties that can be represented in a binary 1-0 fashion. Each attribute is assigned a predetermined bit position in the flag field. These attributes include the INITIAL attribute, the UPDATED attribute, the POWER-OFF attribute, the LOCAL and GLOBAL attributes, the SETC attribute, and the RE-ASK attribute, all of which have been described in detail earlier in the specification.

The next field, designated MLP, contains a member list pointer. The function of this pointer is to provide a vehicle to access a linked list of RULE nodes, i.e., EVIDENCE nodes that ask this question, so that when the question is asked for the first time, that answer is available to all other nodes. The details of how the Class membership linked list (CMLL) is established and how the MLP pointer is used to obtain access will be described later on in connection with the hashtable and the property list description for the RULE node objects.

The next field in the Class record is the property list pointer which points to a linked list of properties or attributes for the Class. As indicated previously, a Property List is associated with each object in the Rulebase and while each list is not identical, there are sufficient similarities to warrant describing them together in order to understand and contrast the differences. That description appears later on in the specification.

The last field in the Class record is the NCP field which contains the next Class pointer to the following Class and, hence, link the individual records into a linked list. The Class section ends with the NCP field of the last Class record containing a pointer to the Procedure section of the Rulebase, specifically to the first record in the Procedures section labeled PR1 in FIG. 6.

THE PROCEDURES LIST RECORD

Since several fields in the Procedure list records are identical to the fields having the identical names in the Class list records, they are not described again. The PF field is the Procedure function field and indicates if the Procedure is to be loaded into the system from diskette, executed, or deleted from the memory of the system. The NAME field contains the name assigned to this Procedure. The following five fields, Prior, Weight, Flags, MPL, and PLP fields are identical to the fields in the Class record. The field titled AP contains a pointer to the list of arguments that are passed to the Procedure being called. Each argument to be passed is contained in a different record which has a field format that characterizes the nature of the variable in terms of it being an integer or a character string, its size, etc. In addition, a field is provided for a pointer to point to the location for the values returned by the Procedure.

The next field in the Procedure record is the RP field which contains a pointer to a linked list of records, each of which contains a specific value that has been generated and returned by that Procedure. The last field of the Procedure record is designated NPRP and contains a pointer to the next Procedure in the linked list.

The major Parameter list is, again, a linked list of records having a format shown in FIG. 6. Briefly, it will be recalled that a Parameter is basically a question that is asked of the user to obtain an answer which can be inserted into a Class-type question at a point which permits the same basic Class question associated with an EVIDENCE node to be asked in different situations, merely by changing the variable insert.

THE PARAMETER LIST RECORD

The Parameter record contains the index field, a name field, a flag field, a property list pointer field, and a next Parameter pointer field which functions like their counterparts in the records previously described. The default field is unique to the Parameter record, in that it allows a default answer to be provided by the system to the question being asked by the Parameter in the event the user does not provide an answer.

THE PROPERTY LIST

The property list pointer (PLP) points to a linked list of properties or attributes for that object. As shown in FIG. 6, a property list pointer (PLP) field is associated with a Class record, a Procedure record, and a Parameter record, as well as a Rule to be discussed later. When a variable piece of text is to be used with that object the attribute or property called Text Parm is assigned to the object. The variable text is obtained, for example, by previously asking the user a question such as "What is your phone number?" The question would take the form of a Parameter named "phone number," and the answer would be stored on the property list of that Parameter object under the property entitled, "Response." The name of the Parameter, "phone number," would also be on the property list in the "name" field. When another object, e.g., a Class, Procedure, or Parameter needs to insert the response provided by the Parameter named "phone number", the property "Text Parm" is added to the property list for that object. The "Text Parm" property points to an Associated Parameter list which names the Parameter "phone number" whose answers are required in place of the variable text. The "Text Parm" attribute points to the first name in the associated property list. The first name is hashed to provide an entry into the hashtable (described next) to find the pointer to the Parameter named "phone number." Once the record named "phone number" is found on the linked list of Parameter records, its Property list is scanned. The attribute, "Response," is located, since it was assumed the question has been previously asked.

The data (408-462-4325) previously provided by the user was stored on the property list under the attribute Response. That stored response, 408-462-4325, is then inserted for the variable text in the object.

If, in scanning the property list, the system finds that the question was not asked, as indicated by a flag bit, then the attribute Text is located which provides a pointer to a list of text records for this Parameter. The text record contains a message pointer into a message file which is a file of records containing all of the text phrases that are used in the Rulebase. The message pointer points to the appropriate text for the question to be asked which is then presented to the user.

THE HASHTABLE

The details of the hashtable referred to earlier will now be discussed in connection with FIG. 8. The hashtable 80 is stored in a predetermined area of memory and consists of a series of sequential memory locations 81 which store pointers 82. It will be recalled that each object, e.g., Class, Procedure, Parameter, and RULE node has a name which is, for example, eight characters long. A hasing algorithm involving a calculation is employed to convert each name to an address in the hashtable section of the memory. The hashtable, for example, may include 100 different memory addresses. The hashing algorithm would operate to convert, for example, 1,000 different object names, so that more than one name gets converted to a given hashtable location. Each location in the hashtable contains pointer 82 to a different linked list 83 of records having a field format as shown in FIG. 8. These linked lists of Records 84 associated with the hashtable are referred to as hashbuckets, and the pointer 82 in the hashtable 80 is referred to as the hashbucket pointer (HBP). The record 84 includes a field 85 for the name that was hashed, a series of 86 fields for pointing to the location in memory where the object or objects are stored, and a field 87 referred to as the next hashbucket pointer, for storing a pointer to the next hashbucket on the list. The memory location reference pointer fields 86 contain either the Class reference, the Procedure reference, the Parameter reference, or the Rule reference pointer, depending on the type of object whose name was hashed to the corresponding entry in the hashtable.

It should be understood that one of the main functions of the hashtable 80 is involved in associating a name that has been assigned to an EVIDENCE node or an EXTERNAL node on a Rule tree in the Rulebase, whose goal has been selected to be concluded, to a pointer. Since the node has a name, the location of the object having that name on one of the major linked lists is obtained through the hashing process to obtain the reference pointer to that object. The hashtable 80 also functions to locate an object using the object name for other reasons, to be discussed later.

MEMBERSHIP LINKED LIST

The records for the major Class list and for the major Procedure list as shown in FIG. 6 include a field MLP for storing a membership list pointer MLP. It will be recalled that, while the same question (Class) may appear in many different RULE nodes throughout the Rulebase, it will only have to be asked once, the first time it is referenced in an EVIDENCE node. After that, all other nodes that ask the same question are automatically updated by the system. A similar situation exists for Procedures, in that all nodes having that Procedure name and a GLOBAL attribute are updated with results that are obtained from running the Procedure the first time.

The vehicle for updating the Class objects or Procedure objects is the Membership Linked List that is pointed to by the Class MLP pointer for Class objects and a Procedure membership linked list for the Procedure objects.

MEMBERSHIP LIST-CLASSES

Figure 9:
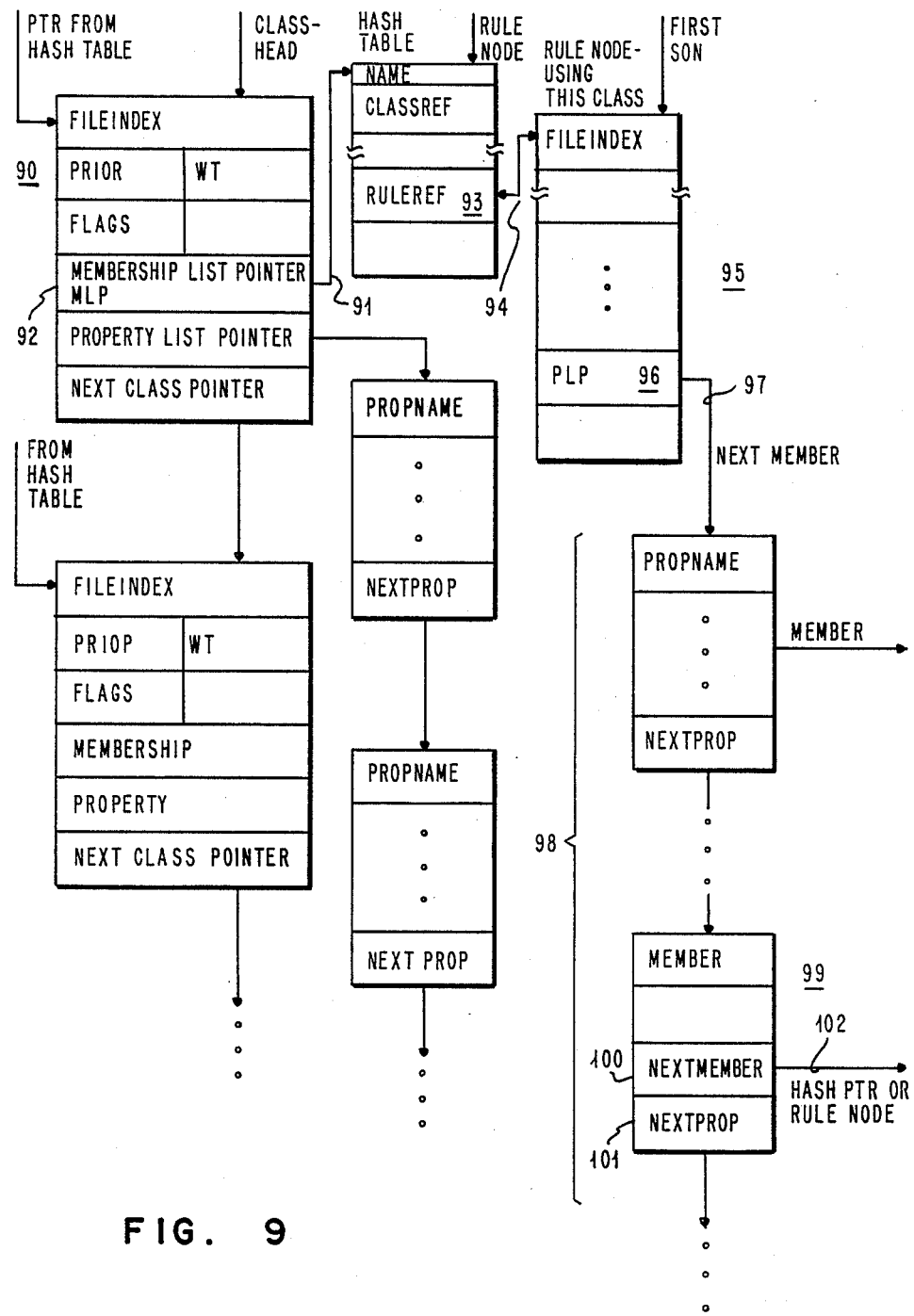
FIG. 9 illustrates the relation of the Class linked list, the member list, the Hashtable, and RULE nodes that are members of the Class.

The relationship of the Class object's membership linked list pointer to the RULE nodes that are members of the Class can be seen by reference to FIG. 9. In FIG. 9, the first record 90 in the major Class linked list contains the membership list pointer 91 in the field 82 MLP. This pointer, represented by line 91, points to a field 93 in the hashtable called, "Rule Reference." Rule reference contains a pointer 94 to the first RULE node in the Rulebase using this Class. That RULE node is in the major Rule linked list and, as such, is represented by a record having a field 96 called "PLP," which contains the property list pointer 97 that points to the linked list of properties 98 for RULE node 95. The linked list of properties 98 for RULE node 95 includes a record 99 having the property name, "Member." The record entitled "Member" includes a field 100 called "Next Member Pointer," and a field 101 called, "Next Property Pointer." The next member pointer 102 points to the RULE node (not shown) in the major RULE node linked list which is the second member of the Class. This second RULE node also includes a property list which, in turn, includes a record named, "Member," which includes a field called, "Next Member Pointer." As before, the Next Member field contains a pointer to the third RULE node, located at some point in the major Rule linked list which is a member of this Class.

The above described chaining process is repeated until the last member of the Class is reached, which is signified by the next member property pointer being a null pointer.

The Class membership linked list for a Class object may therefore be viewed as a selected subset of RULE node objects from the major RULE node linked list, the top RULE node of the subset being selected for the subset by the Rule reference pointer 94 in the hashtable that is addressed by the membership list pointer 91 from the Class object 90. Subsequent RULE nodes belonging to the Class are selected for the subset by a next member pointer 102 located on the property list 98 of the RULE node 95 in a record 99 named "member."

MEMBERSHIP LIST—PROCEDURES

Figure 10:
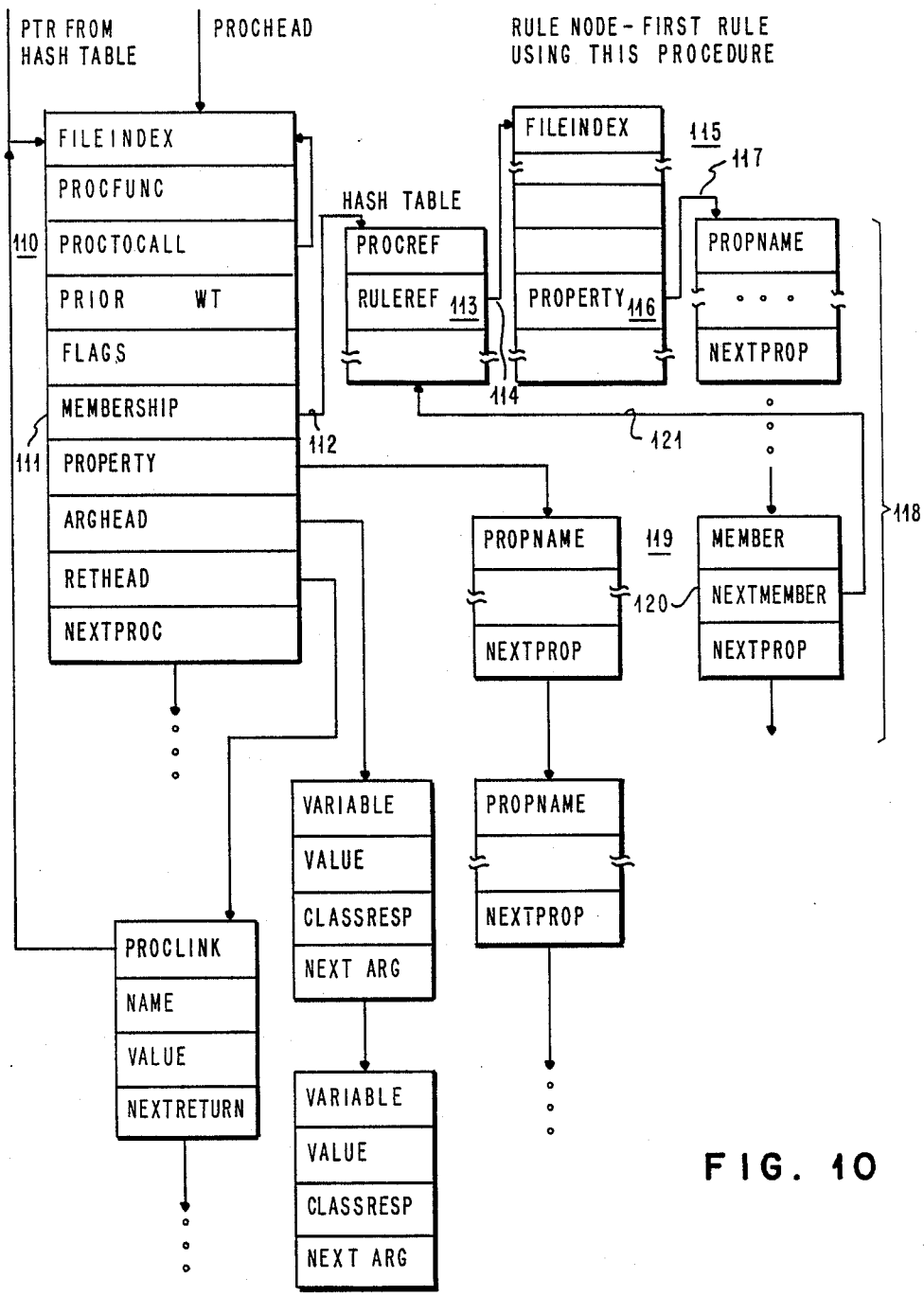
FIG. 10 illustrates the relation of the Procedure linked list, the Membership list of a Procedure object, the Hashtable and the RULE nodes that are members of the Procedure object.

The membership linked list for a Procedure object is related to the Procedure objects, the hashtable, and the RULE nodes in a manner identical to the membership linked list for a Class described above. As illustrated in FIG. 10, the first Procedure record 110 in the major linked list of Procedure objects includes a field 111 called the membership list pointer field which contains a pointer 112 to the Rule reference field 113 of the hashbucket associated with Procedure 110. Rule reference field contains a pointer 114 which points to the first RULE node 115 that uses this Procedure. RULE node 115 has a field 116 which contains the Property List pointer 117. Pointer 117 points to the linked list 118 of properties. The property 119 named "member" includes a next member field 120 having a pointer 121 which points to the next or second RULE node that uses this Procedure. The chaining process described above is repeated until all RULE nodes that are members have been identified. The last RULE node of the membership list has a null pointer in the next member field 120.

PARAMETER LINKED LIST ORGANIZATION

Figure 11:
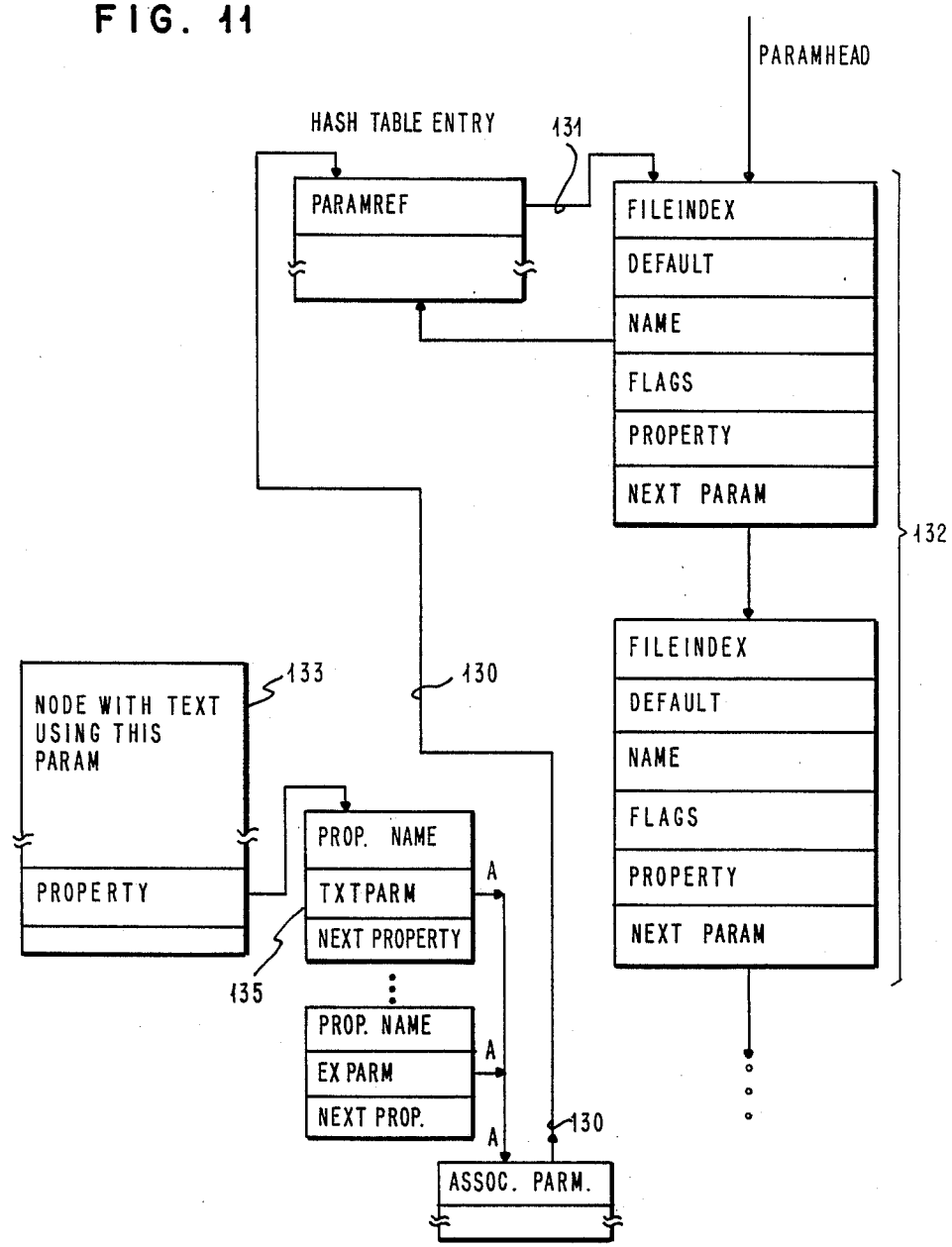
FIG. 11 illustrates the organization of the Parameter linked list.

The organization of the Parameter linked list and the relationships of the Parameters to the hashtable and RULE nodes is shown in FIG. 11. Entry into the Parameter list 132 is required primarily in two different situations, both of which originate during the processing of either an EVIDENCE node or an EXTERNAL node such as node 133. As described in connection with the property list, the attribute TXT Parm is assigned to an object that uses text that includes a variable piece of data which is provided by the user (or Procedure) in response to the question asked by the Parameter. The Parameter name appears on the Property list of the Class or Procedure associated with the RULE node. The variable to be inserted in the text of the RULE node 33 being processed has previously been stored in memory at a location that is pointed to by a pointer in the "Response" field. The Response field is on the Property list of the Parameter whose answer is to be inserted as the variable. The problem is to find the location of the Parameter on the linked list so that the answer can be inserted into the text to be displayed by the node currently being processed. An associated Parameter list is developed for a node that requires the answer from a Parameter. The list includes, for each entry, the name of the Parameter, a pointer to the location of the Parameter, and a pointer to the next entry since more than one Parameter may be required. By pointing to the first entry in the associated Paramter list with a pointer in the TXT Parm attribute 135 of the node being processed, the system is able to locate the answer to the question which is to be inserted.

The other situation is shown in FIG. 11 and involves locating the Parameter which is named so that the actual text can be presented to the user as a question to obtain the response. The text of the question to be presented is in a message file. The location of this message file is pointed to by the message pointer located on the property list of the Parameter in an attribute field called TEXT. The Parameter is located by the Paramref pointer in a hashbucket that is located by hashing the name of the Parameter that is obtained from the node 33 being processed.

THE RULE LIST

Figure 12:
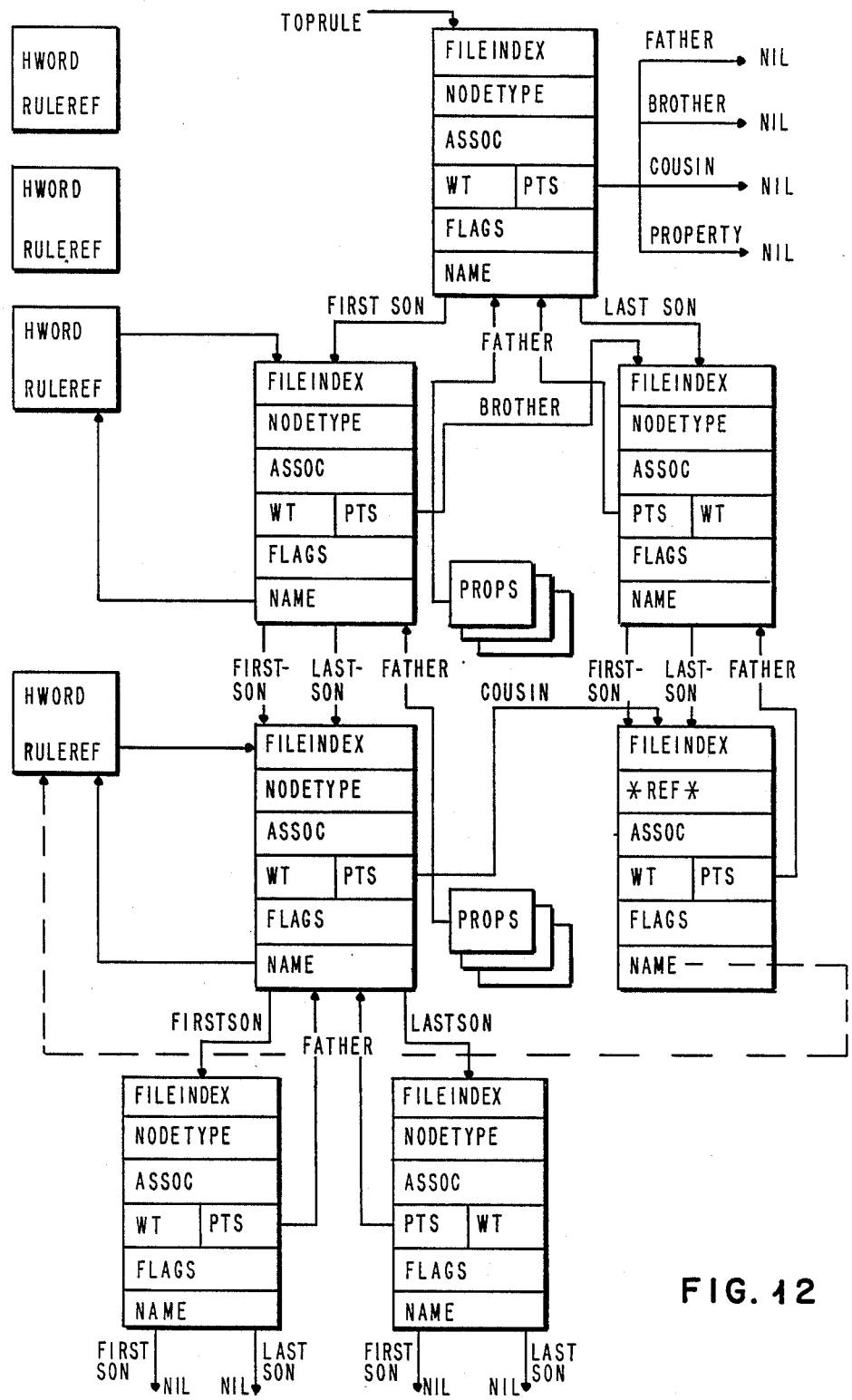
FIG. 12 illustrates the organization of the Rulenode linked list

The last major section of the rulebase to be described is the Rule List which is shown in FIG. 12. The Rules List is basically similar to the other linked list in the rulebase, in that each node or record points to a succeeding node. However, since each node generally points to more than one other node in the list, it is more easily visualized as a tree type structure, as shown in FIG. 12.

Each node, as shown in FIG. 12, includes a plurality of fields such as the fields, fileindex, node type, association, wait, flags, and name, in addition to a number of fields for pointers to other related nodes in the rulebase. These pointers are shown next to the top dummy node 120, and are named following a "family tree" convention such as Father, Brother, Cousin, First Son, and Last Son, to convey a relative relationship to other nodes. The Brother pointer points to node having the same Father node and positioned at the same level in the rule tree. The Cousin pointer points to a node that is being referenced. Each node also has a pointer to a property list which functions in a manner that is identical to the property list associated with the other linked lists, as described previously.

Eaach leaf node in a rule tree has a relationship to a node in the Class linked list or on the Procedures linked lists. As a node is being processed, the node type is identified. If an evidence node is identified, the property "EVIDSOURCE" is located on the property list of the node. This property contains the name of the Class with which the rule node is associated. That name is hashed to provide an entry into the hashtable and hashbucket for locating the related Class object on a linked list of Classes, as described previously.

If the leaf node is identified as an external node which identifies a procedure to call, a similar series of steps are taken to locate the associated Procedure definition on the linked list of Procedures.

The internal nodes of the trees are involved primarily in the logical calculation of confidences and passing these calculated values of the confidences up to the GOAL node following some prescribed algorithm. These functions are handled by specific programming modules which are part of the inference engine.

OPERATION OF SYSTEM

Figure 13:
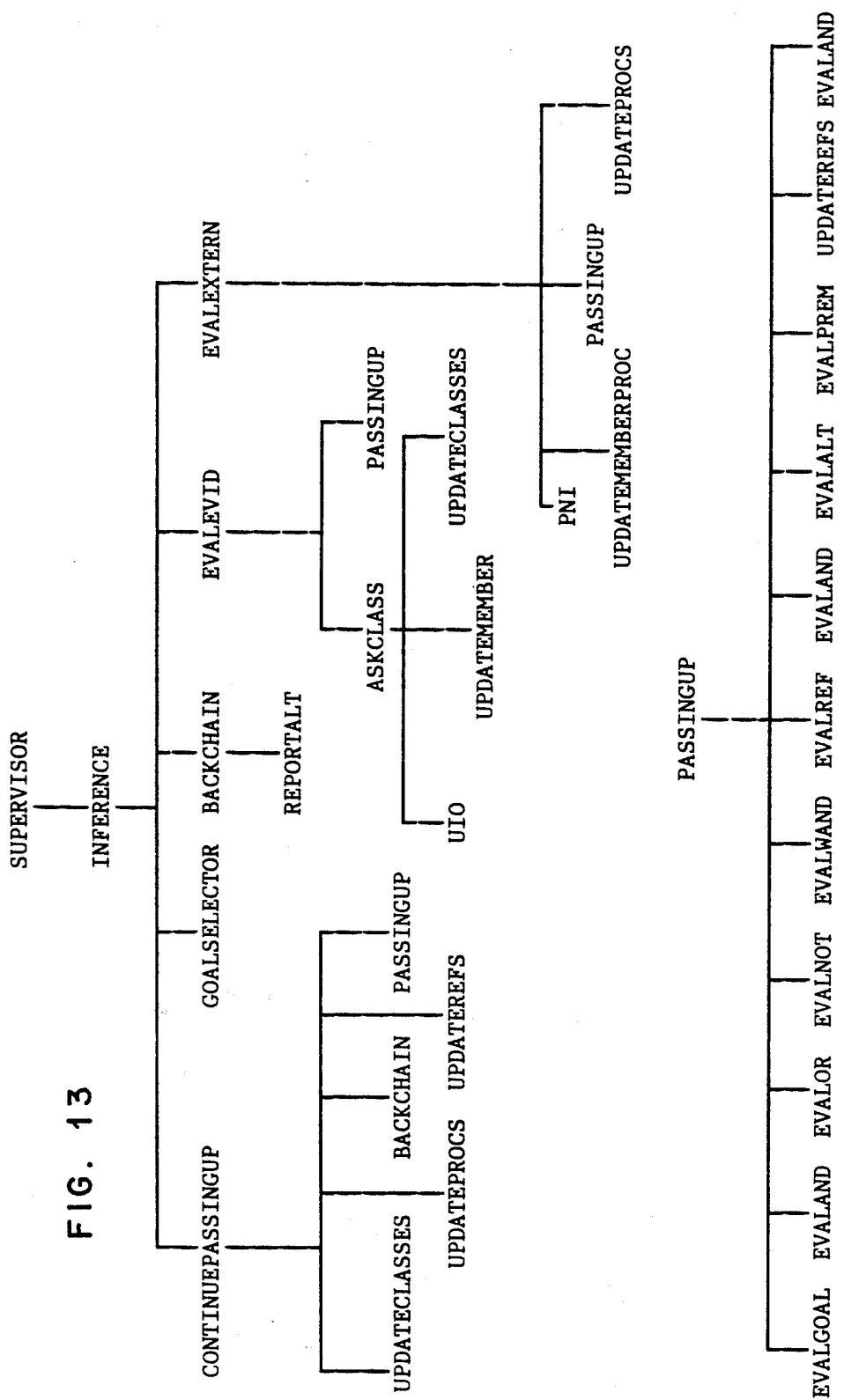
FIG. 13 illustrates the organization of the various programming modules employed in the Expert System

A summary of the operation of the system will now be described in connection with FIG. 13. FIG. 13 illustrate the organization of the various programming routines that are included in the CONSULT function referred to earlier in the specification.

CONSULT has a SUPERVISOR routine which interfaces to the program calling the Expert System and returns to it the list of concluded goals. SUPERVISOR is responsible for keeping a list of the rulebases called and a list of the goals concluded for each of these rulebases. It loads in the initial rulebase. When another rulebase is called, it stores out the calling rulebase along with the information gathered for it so far (e.g., answers to class questions, values returned from procedures, and confidences obtained for goals) and loads in the called rulebase. It is also responsible for passing between rulebases information such as an answer to a class or values returned from a procedure. SUPERVISOR calls the routine INFERENCE which contains the inferencing logic. INFERENCE performs the main consultation routines. It will select goals to be tested and then backchain through the nodes under the selected goal to find evidences or external nodes to evaluate. INFERENCE, along with the procedures it calls, causes questions to be asked and procedures to be run, and draws conclusions based on this information. INFERENCE returns to SUPERVISOR when a goal is concluded, a rulebase is exhausted, a new rulebase is called, a severe error occurs, power is about to be turned off, or a break key is entered.

When the INFERENCE routine is called by the SUPERVISOR, its first action is to run the routine GOAL SELECTOR to select a goal to trace. That goal will be the root of a tree which is then searched in a postorder traversal until the first unasked leaf node is found. This searching is done by the BACKCHAIN routine. When an evidence or external node is found the routines EVALEVID or EVALEXTERN are run, the property list is scanned until the property name "evidsource" is found. This property contains a pointer to the hash table which, in turn, points to either the class node (for the question which needs asking) or the procedure list entry (for the procedure which needs calling) when the data is obtained by running the ASK CLASS routine or the PNI routine. The weight of that node is updated by routines UPDATE CLASSES or UPDATE PROCS followed by the updating of all references to that node. As soon as a reference node is updated, its weight is passed as far up the tree in which it is located as possible. Once all references to a node are updated and passed up, the weight of the original evidence or external node will be passed up. During all passing up routines, references to any node established along the way will be updated and passed up recursively. Finally, any other nodes which are members of the same class or procedure definition will be evaluated in the same manner by the UPDATE MEMBER routine.

At any time during this processing, a rulebase call can be encountered. To resume processing in the original rulebase after the exhaustion of the called rulebase, several things need to be determined. First, the tree or goal which was selected needs to be located. Second, the question or procedure which was asked or executed should be isolated. Third, the evidence or external node asked or executed should be isolated. Finally, if all of the references to that node were updated and passes up, the node above the evidence should be found and examined. Eventually, the node n which the rulebase call was initiated will be found.

As discussed earlier, to mark nodes for resumption, two Boolean values are associated with each node: an 'asked' flag and an 'updated' flag. Each class, procedure, and rule node has a flag to indicate whether or not it has been asked, and a flag to indicate whether or not it has been updated. Rule nodes also have a flag for indicating if the rulebase call associated with it has been performed. A class is marked 'asked' as soon as it has been presented to the user. A procedure is marked 'asked' as soon as its procedure call has been executed. A rule node is marked asked as soon as its evaluation function is performed and the node is given a weight. The 'updated' flag is used to find the node in progress. A class or a procedure is marked 'updated' as soon as all evidence or external rule nodes which are members of this class or procedure have been evaluated, updated, and passed up. A reference node is marked 'updated' once its weight has been passed up the tree as far as possible. All other rule nodes are marked 'updated' as soon as all references to them have been updated and passed up. Since it is necessary to insure that a rulebase is not called more than once from the same node, each rulenode has a third Boolean flag associated with it. A rulenode is marked 'reported' as soon as its call is found and invoked. When a rulebase is re-entered following a call to another rulebase or after powering off the machine, the SUPERVISOR program passes a single Boolean value to INFERENCE routine indicating that this is not the first time this rulebase has been encountered. If this Boolean value is true, a routine is called which looks through the list of classes for a class which has been marked 'asked,' but not marked 'updated.' If an asked but not updated class if found, its members are examined until an asked, but not updated evidence node is located. The references to this evidence node are checked to see that all have asked and updated. If so, the nodes above the evidence node are examined; otherwise, the nodes above the asked but not updated reference node are examined. Finally, a node which was asked, but not updated is found. It is the node at which the tracing of the rulebase was suspended. If there are no questions which are asked but not updated, then the list of procedures will be examined for procedure calls which are asked but not updated in the same manner. Eventually, the location of the node which caused the interruption is isolated, and processing can resume from the point at which it left off.

Following is a short description of the routines shown in FIG. 13 including pseudocode programming statements for many of the more involved routines.

PROGRAM: SUPERVISOR

FUNCTION: Supervising program;

This program calls INFERENCE. It handles multiple rulebase calls and the passing of information between rulebase calls. It receives the pointer to the initial linked list.

PSEUDO CODE:

```
begin program
    initialize variables and pointers for call to initial
    rulebase;
        loop1:while (rule bases to be processed) do
            loop2:while (continue on current rule base) do
                call INFERENCE:
                case of
                    (goal concluded)
                        add goal to list;
                    (rule based finished)
                        If no more rulebases to do
                            then leave loop1
                            else
                                pop rulebase stack to uncover next
                                rulebase;
                                leave loop2;
                    (call to new rulebase)
                        store current rulebase for future use;
                        push new rulebase name on stack;
                        leave loop2;
                    (turn off power)
                        store current rulebase for future use;
                        prompt user to turn the-machine off;
                        change action if he does not;
                end loop2;
                set variables for next rulebase from current
                place on stack;
        end loop1;
end program;
```

INPUT:

Pointer to system control block containing initial rulebase name.
OUTPUT:
Same pointer, list now complete.

PROGRAM: INFERENCE

FUNCTION: Main inference engine;

This procedure performs the main consultation routines. It will select goals to be tested, backchain through the nodes of a goal to find evidences or external nodes to evaluate. It will return to the extended supervisor with concluded goals, rulebase calls, goals to be removed from the goal list after resets from the user, or when the rule-base is exhausted.

PSEUDO CODE:

```
firsttime then
    reset the weights of classes, nodes, and procedure
    calls ask classes and execute procedures designated
    initial
        else if last action was not goalconcluded then
            CONTINUEPASSINGUP
        while not timetoreturn then repeat
            GOALSELECTOR(currentgoal)
            if goal asked then
                timetoreturn = true;
                action = rulebaseexhausted
            else
                currentnode = currentgoal
                BACKCHAIN(currentnode)
                case of currentnode .nodetype of
                    evid:EVALEVID(currentnode)
                    extern:EVALEXTERN(currentnode)
        until timetoreturn to systemreset
end;
```

INPUT:
Rulebase pointers, flag for firsttime and resume, etc.
OUTPUT:
Action—action to be taken by Supervisor
Goalinformation—text and confidence of concluded goal
Rulebasename—filename of rulebase to call

MODULE NAME: ASKCLASS

FUNCTION: Ask a class question:

This procedure accepts as input a pointer to the class currently of interest. It determines whether or not that class should be asked or re-asked based on the current values of the 'class' attributes. It asks the question when appropriate and calls UPDATECLASSES to update nodes that are members of that class.

PSEUDO CODE:

```
if class should be asked (depending on local, global
    and reask attributes)
    then begin
        if parameter(s) in text
            then obtain parameter text and merge into question
            text;
                get answer property;
                get number of choices property;
                call UIO (the user interface routine) to display
                question and obtain answer(s);
                if class not local then asked = true;
                if (class is local) or (class is settable) or
                (class should be updated)
                    then UPDATEMEMBER(current class)
                    else UPDATECLASSES(current class);
            end then;
        else UPDATECLASSES(current class);
```

INPUT:
Pointer to current class;
Pointer to current rulenode.
OUTPUT:
Timetoreturn may change to TRUE indicating that control should pass back to the supervisor.

MODULE NAME: BACKCHAIN

FUNCTION: Backchain in preorder through tree to get next node to evaluate;

This procedure returns the next node to evaluate in the current rule tree. This node will be either:
(1) Unasked evidence
(2) Unasked or reexecutable extern
(3) Asked but nonupdated node of any other type after resumption from another rulebase call.

PSEUDO CODE:
```
outoftree := false;
  while not outoftree and not foundnode do
    if nodetype = alternate then REPORTALT
    else if nodetype = reference then switch to
      referrenced node
      else if unasked
        then if firstson = nil
          then runtimerror(4); outoftree = true
          else current node = first son
        else if brother = nil
          then runtimerror(12); outoftree = true
          else currentnode := brother
  end while
```

INPUT:
Pointer to a node at the top of a tree found by GOALSELECTOR
OUTPUT:
Pointer to the next node to evaluate in establishing that original node.

MODULE NAME: CONTINUEPASSINGUP

FUNCTION: Continue passingup weights from point in which interruption occurred;

This procedure is called from the main inference routine after being invoked by the Supervisor following a call to a new rulebase. It will resume updating classes, procedures, or passingup from the point at which the rulebase call was made. Class and procedure nodes which have been asked will be marked either updated or not updated. If they are updated, all members of that class or procedure have been evaluated and weights passed up the tree. If they are not updated, then interruption to the normal update and passingup routines to members of this class occurred.

Interruption of processing could have occurred while updating references to a particular node. If this has happened, the node in question will be asked, but not updated. If a non-reference node is updated, all references to it have been updated and weights passed up. A reference node will be marked updated as soon as its weight is passed up.

PSEUDO CODE:
```
currentclass = classhead
while currentclass <> nil and not (currentclass asked & not
updated & not settable)
    currentclass = currentclass_next
if currentclass <> nil then
    UPDATECLASSES (currentclass, timetoreturn)
else
```

PSEUDO CODE:
```
currentproc = prochead
while prochead <> nil and not (current proc asked and
not updated) do
    currentproc = currentproc_.next
if currentproc <> nil then
    UPDATEPROCS(currentproc, timetoreturn)
else
    nodeinprogress = currentgoal
    BACKCHAIN(nodeinprogress)
    UPDATEREFS(nodeinprogress,timetoreturn)
    if not timetoreturn and father <> toprule then
        PASSINGUP(nodeinprogress, timetoreturn)
```

INPUT:
Pointer to currentgoal, classhead, prochead, and toprule
OUTPUT:
Rulebase updated as much as possible after evaluating last evidence or external timetoreturn will be true if a call to another rulebase is encountered during the continuation of passingup.

MODULE NAME: EVALEVID

FUNCTION: Evaluate evidence node;

If the current evidence node is a member of a class, then EVALEVID call ASKCLASS which asks the question and sets the weight for that node. If the text is in the evidence node, then EVALEVID asks the question and computes the weight itself. If the node if not a member of a class nor is there text in the node, then the node is given the weight it had previously. EVALEVID then normalizes the node if it has the normalize property and marks the node as asked. It then calls PASSINGUP to pass the confidence as far up the tree as possible. After returning from PASSINGUP, if it is not time to return, it marks the current node as updated.

PSEUDO CODE:
```
If evidence node is a member of a class
    then begin
        ASKCLASS(curntclass, curntnode, timetoreturn);
        if systemreset then return;
    end
    else if question text is in evidence node
        then begin
            ask the question in the evidence node;
            compute the weight for the node depending on the
            answer;
        end
        else curntnode.weight = curntnode.priorweight;
if curntnode.normal = true then normalize;
curntnode.asked = true;
PASSINGUP(curntnode, timetoreturn);
if not timetoreturn
    then curntnode.updated = true;
```

INPUT:
Pointer to current node (an evidence node);
OUTPUT:
Evidence node evaluated and weight is set; timetoreturn may change to true indicating that control should be passed back to the Supervisor without further evaluation;

MODULE NAME: EVALEXTERN

FUNCTION: Evaluate external node;
Each external node refers to a procedure by name. The external node is said to be a member of this procedure. An external node can make an 'indirect reference' to a procedure meaning that if the procedure has not already been executed, this external node will not cause it to be executed. Instead, it will pass up minweight (or false) to its parent node. The function of procedure EVALEXTERN is to cause execution of the procedure which the current external node is a member. This is assuming that it is not an indirect reference. If this external node has the local or reexecute attributes or any parent is local, then the weight is passed up only in the current tree. Otherwise, any external node which is a member of this procedure is updated. If the external node has an indirect reference to a procedure, then the procedure is not executed, the node is given the minimum weight allowed, and that weight is passed up the tree.

PSEUDO CODE:

```
whichproc = procedure of which curntnode is member;
if curntnode is not an indirect reference to procedure
    then if (whichproc is not asked) or (curntnode is
    reexecutable) or (whichproc is local)
        then begin
            display associated text;
            if xtrace is on
                then display input parameters;
            call PNI(whichproc); (i.e.the procedure node
            interface routine *)
            if xtrace is on
                then display return parameters;
            if (whichproc is local) or (curntnode is local)
            or (curntnode has a local father) or (curntnode is
            reexecuted)
                then UPDATEMEMBERPROC(curntnode, whichproc,
                timetoreturn,)
                else begin
                    mark whichproc as asked and established;
                    UPDATEPROCS (whichproc, timetoreturn);
                end else;
        end
    else if (whichproc is asked) and (whichproc is
    global)
        then UPDATEPROCS(whichproc, timetoreturn);
else (*curntnode is an indirect reference to
procedure ... begin
    mark curntnode asked and established;
    curntnode's weight = minweight;
    PASSINGUP(curntnode, timetoreturn);
    if not timetoreturn
        then mark curntnode updated;
end;
```

INPUT:
Pointer to current node (an external node);
OUTPUT:
External node evaluated and weight is set; timetoreturn may change to true indicating that control should be passed back to the supervisor without further evaluation;

MODULE NAME: PASSINGUP

Function: Evaluate nodes and pass weights up the tree.
(1) Save current node's weight as the prior value.
(2) Call a procedure to evaluate the function associated with the code name to obtain a new current weight.
(3) If the node is not asked or if was already asked and its weight did not change and it's not global and already updated then don't continue any further.
(4) If the current node is asked and not reported yet, then if the weight is above the high threshold, set any classes or params specified for this node (5) If the current node is asked and not reported yet, then if the weight is above the high threshold, see if any rulebase calls should be made.
(6) If there was no rulebase call then update references to the current node.
(7) If no rulebasecall encountered and the node is not at the top of the tree, then continue investigating parents.

PSEUDO CODE:

```
continu = true;
wasasked = curntnode_.asked;
while continu do
    priorweight = curntnode_.weight;
    case curntnodes_.nodetype of
        goal:       EVALGOAL
        hypothesis: EVALGOAL
        evidence:   if not reported then wasasked = false
        external:   if not reported then wasasked = false
        and:        EVALAND
        or:         EVALOR
        not:        EVALNOT
        wand:       EVALWAND
        reference:  EVALREF
        pand:       EVALPAND
        alternate:  EVALALT
        preempt:    EVALPREM
    end case;
    if node not just updated then continu = false;
    if continu and not reported
        then if weight > threshold
            then
                set classes;
                set parameters
                call rulebases;
                if rulebase to call then continu = false;
    if continu
        then UPDATEREFS(curntnode, timetoreturn);
    if timetoreturn or curntnode at top of tree
        then continu = false;
    if continu
        then curntnode - curntnode_.father;
    end; (*while continu = true*)
end procedure;
```

INPUT:
Pointer to currentnode
OUTPUT:
timetoreturn may change to true indication that control should be passed back to the supervisor

MODULE NAME: UPDATEREFS

FUNCTION: Update references to current node
This module updates all references to the current node and calls PASSINGUP for each node updated. References to a node are called 'cousins' of that node.

PSEUDO CODE:

```
if (curntnode is not a reference node) and (curntnode is
asked) and (curntnode is named) and (curntnode is not
updated)
    then begin
        curntref = cousin of curntnode;
        while (curntref <> nil) and (not timetoreturn) begin
            if [(curntref not asked) or (curntref asked but not
            updated) and (no father is global)]
                then begin
                    PASSINGUP(curntref, timetoreturn);
                    if not timetoreturn
                        then curntref.updated = true;
                end;
            curntref = curntref_.cousin;
        end while;
        if [(not evidence node) and (not external node) and
        (not timetoreturn)]
```

-continued

PSEUDO CODE:

```
        then curntnode_.updated = true;
    end then
    else if (curntnode is not referenced) and (curntnode
is asked)
        then curntnode_.updated = true;
```

INPUT:
Pointer to currentnode.
OUTPUT:
timetoreturn may change to true indicating that control should be passed back to the supervisor. The following modules which are also shown in FIG. 13, and are a part of the inference program, are only described in terms of their overall function and relationship to other described modules. The pseudo code for these modules is considered trivial since it is well within the skill of an average programmer to implement the described functions.

MODULE NAME: EVALALT

FUNCTION: Evaluate alternate node;

This procedure evaluates an alternate node. An alternate node has two subtrees, where the left subtree is an evidence node. EVALALT presents to the user the question for the evidence node. It asks the user whether he is able to answer the question. If the user responds with 'yes,' then the question is asked and the confidence obtained for that answer is the confidence given to the alternate node. If the user responds with 'no,' then and only then is the right subtree traced. In this case, the confidence calculated for that subtree is the confidence given to the alternate node.

MODULE NAME: EVALAND FUNCTION:
Evaluate and node;

This procedure evaluates an and node. It retrieves the confidences of its children nodes and computes its own confidence form these. An and node takes the minimum confidence of its children.

MODULE NAME: EVALGOAL

FUNCTION: Evaluate goal node;

This procedure evaluates a goal node. It retrieves the confidences of its child node and computes its own confidence from this. A goal node takes the weight of its single child and if it is above the GOAL node's upper threshold, the goal is concluded to be true and its conclusion is added to the goal list.

MODULE NAME: EVALOR

FUNCTION: Evaluate or node;

This procedure evaluates an or node. It retrieves the confidences of its children nodes and computes its own confidence from these. An or node takes the maximum confidence of its children.

MODULE NAME: EVALNOT

FUNCTION: Evaluate not node;

This procedure evaluates a not node. It retrieves the confidences of its child node and computes its own confidence from this. A not node takes one minus the weight of its child node.

MODULE NAME: EVALPAND

FUNCTION: Evaluate pand node;

This procedure evaluates a pand node. It retrieves the confidences of its children nodes and computes its own confidence from these. A pand node takes the sum of the weight of its children.

MODULE NAME: EVALPREM

FUNCTION: Evaluate preempt node;

This procedure evaluates a preempt node. A preempt node has two subtrees and an upper and lower threshold. The confidence for the left subtree is first obtained. If it is above the upper threshold or below the lower threshold, then the right subtree is never traced and the preempt node is given the confidence value of the left subtree. If, on the other hand, the confidence for the left subtree is between the lower and upper thresholds. The the confidence for the right subtree is the value given to the preempt node.

MODULE NAME: EVALREF

FUNCTION: Evaluate reference node;

This procedure evaluates a reference node. A reference node occurs only at the leaf of a tree. A reference node takes the confidence of the node which it references.

MODULE NAME: EVALWAND

FUNCTION: Evaluate wand node;

This procedure evaluates a wand node. It retrieve the confidences of its children nodes and computes its own confidence from these. A wand node takes the average of the weight of its children.

MODULE NAME: GOALSELECTOR

FUNCTION: Select next goal;

This procedure chooses the next unasked goal in the rulebase. Only goals or hypotheses nodes at the top of a tree will be returned. If all goals have been asked already, the goal returned will be marked asked.

MODULE NAME: PNI

FUNCTION: Procedure node interface;

PNI is passed a pointer to a procedure node when this procedure is to be executed. From the definition in this procedure node, PNI obtains the values to be passed and builds a call to the procedure. The procedure was not bound in with the system before execution. After the procedure returns control to PNI, PNI takes values returned from this procedure and puts them into the appropriate places in the system data structures.

MODULE NAME: REPORTALT

FUNCTION: Investigate and report alternate node;

This procedure will investigate an alternate node in order to determine which branch of the subtree should be used for backchaining. The node which is the root of that subtree is returned as curntnode. The node passed to this routine must have been previously found to be an alternate node.

MODULE NAME: UIO

FUNCTION: User Input/Output interface;

The user interface routine takes care of all interaction between the system and the display and between the system and the keyboard. It displays questions, processes user input, recognizes when special keys are pressed (such as quit or escape), and is used to display the goals concluded.

MODULE NAME: UPDATECLASSES

FUNCTION: Update all evidence nodes which are members of the current classes;

This procedure is called after a class has been evaluated. UPDATECLASSES updates all evidences which are members of this class (i.e., all evidences which refer to this class) by calling UPDATEMEMBER. A node is NOT updated along with other members if it (1) is not local, (2) does not have the reask attribute, and (3) does not have any local fathers.

MODULE NAME: UPDATEMEMBER

FUNCTION: Update single member of current class;

Once a class is evaluated, this procedure is called to update a single member of that class. Then procedure PASSINGUP is called to pass the confidence obtained for that node up the tree.

MODULE NAME: UPDATEMEMBERPROC

FUNCTION: Update single member of current procedure;

Once a procedure call has been executed from the rulebase, this procedure is called to update a single member of that procedure. Then the procedure PASSINGUP is called to pass the confidence obtained for that node up the tree.

MODULE NAME: UPDATEPROCS

FUNCTION: Update all members of the current procedure;

Once a procedure call has been executed from the rulebase, all external nodes which are members of this procedure have their weights updated and passed up the tree. UPDATEPROCS locates all external nodes which are members of this current procedure and for each member, UPDATEMEMBERPROC is called.

While the invention has been shown and described with reference to a preferred embodiment thereof, it should be understood by those skilled in the art that various changes in the form and details may be made without departing from the scope and spirit of the invention.

We claim:

1. In an artificial intelligence system a method of collecting data by tracing a rulebase of an Expert System program with a data processing system having a processing unit and a memory subsystem which functions with said Expert System program as an inference control engine, the improvement comprising in combination the steps of:
    (1) storing in said memory sybsystem a second program which is operable in cooperation with said processing system to develop a predetermined set of data;
    (2) calling with said Expert system program said second program in response to tracing a Rule tree that contains a predetermined type node that contains ID data that identifies said second program, said step of calling further including the step of converting said ID data to a pointer for locating an address of said second program in said memory subsystem;
    (3) operating said second program with said data processing system to develop said set of data;
    (4) transferring said set of data developed by said second program to said predetermined type node after said second program is executed by said data processing; and
    (5) processing with said inference control engine said Rule tree to a Goal node based on said transferred set of data.

2. The method recited in claim 1 in which said data processing system includes a plurality of hardware units and the step of operating said second program further includes the step of exercising a predetermined one of said hardware units to develop said data.

3. The method recited in claim 2 further including the steps of, storing a plurality of other programs in said data processing system, each of which when executed exercises a different one of said hardware units to develop data for use in said Expert system, and establishing a list of Procedure records corresponding to said Procedure nodes, each said record defining a different external procedure corresponding to one of said other programs that is on-line to said data processing system.

4. The method recited in claim 3 which further includes the step of dividing each of said records into a plurality of fields and assigning to each said field a predetermined attribute of said procedure.

5. The method recited in claim 3 in which said step of calling said second program includes the step of locating one of said Procedure records in said list of Procedure records which corresponds to said second program that is identified by said predetermined type node of said Rule tree.

6. The method recited in claim 4 further including the step of establishing with said Expert system a hashing table in the memory of said data processing system, said table having a plurality of memory address locations, each of which includes a pointer to one of said records on said list and said step of locating includes the further step of converting said ID data of said procedure in said predetermined type node to a memory address in said hash table by a predetermined hashing algorithm.

7. The method recited in claim 4 further including the steps of establishing at least one field in each of said Procedure records that contains data that can be varied; and passing said data in said at least one field to said second program.

8. The method recited in claim 6 in which said second program causes operation at two different times of two separate but similar functional hardware units in response to different said data being passed to said second program at said different times in said variable field.

* * * * *